US012786572B2

(12) United States Patent
Larsen et al.

(10) Patent No.: US 12,786,572 B2
(45) Date of Patent: Nov. 3, 2026

(54) GRAPHICS PROCESSORS

(71) Applicant: Arm Limited, Cambridge (GB)

(72) Inventors: Daniel Fedai Larsen, Trondheim (NO); Tord Kvestad Øygard, Trondheim (NO); Frank Klaeboe Langtind, Trondheim (NO); Andreas Due Engh-Halstvedt, Trondheim (NO)

(73) Assignee: Arm Limited, Cambridge (GB)

( * ) Notice: Subject to any disclaimer, the term of this patent is extended or adjusted under 35 U.S.C. 154(b) by 172 days.

(21) Appl. No.: 18/754,006

(22) Filed: Jun. 25, 2024

(65) Prior Publication Data

US 2024/0348935 A1 Oct. 17, 2024

Related U.S. Application Data

(63) Continuation of application No. 18/323,768, filed on May 25, 2023, now Pat. No. 12,052,508.

(30) Foreign Application Priority Data

May 30, 2022 (GB) ..................................... 2207963

(51) Int. Cl.
*H04N 23/73* (2023.01)
*G06T 5/92* (2024.01)

(52) U.S. Cl.
CPC ............... *H04N 23/73* (2023.01); *G06T 5/92* (2024.01); *G06T 2207/20172* (2013.01)

(58) Field of Classification Search
None
See application file for complete search history.

(56) References Cited

U.S. PATENT DOCUMENTS

| | | | | |
|---|---|---|---|---|
| 7,023,437 | B1 | 4/2006 | Voorhies et al. | |
| 2009/0201306 | A1 | 8/2009 | Dyke | |
| 2011/0080419 | A1 | 4/2011 | Croxford et al. | |
| 2015/0302545 | A1* | 10/2015 | Harris | G06T 1/20 345/501 |
| 2023/0388651 | A1 | 11/2023 | Larsen et al. | |

FOREIGN PATENT DOCUMENTS

EP 2946364 B1 10/2021

OTHER PUBLICATIONS

Combined Search and Examination Report under Sections 17 and 18(3) dated Nov. 30, 2022, GB Patent Application No. GB2207963.6, 6 pages.
Notice of Allowance dated Mar. 27, 2024, U.S. Appl. No. 18/323,768, 34 pages.

* cited by examiner

*Primary Examiner* — James M Hannett
(74) *Attorney, Agent, or Firm* — Pearl Cohen LLP

(57) ABSTRACT

A method of processing data in a graphics processor when performing tile-based rendering in which a render output is sub-divided into a plurality of tiles for rendering. The rendering is performed as two separate processing passes: a first processing pass that sorts primitives into respective regions of the render output and a second processing pass that renders the tiles into which the render output is sub-divided for rendering. During the first processing pass, "tile elimination" data is generated indicative of which of the rendering tiles should be rendered during the second processing pass. The tile elimination data generated in the first processing pass can then be used to control the rendering of tiles during the second processing pass.

17 Claims, 9 Drawing Sheets

GRAPHICS PROCESSORS

CROSS-REFERENCE TO RELATED APPLICATIONS

This application is a continuation of, and claims priority to U.S. patent application Ser. No. 18/323,768, entitled "GRAPHICS PROCESSORS", filed May 25, 2023, issued as U.S. Pat. No. 12,052,508 on Jul. 30, 2024, which claims priority pursuant to 35 U.S.C. 119 (a) to British Application No. 2207963.6, filed May 30, 2022, which applications are incorporated herein by reference in their entirety.

BACKGROUND

The technology described herein relates to graphics processing systems, and in particular to methods and systems for use when processing data in a graphics processor when performing so-called "tile-based" rendering in which a render output is sub-divided into a plurality of tiles for rendering.

Graphics processing is normally carried out by first dividing the graphics processing (render) output to be rendered, such as a frame to be displayed, into a number of similar basic components of geometry to allow the graphics processing operations to be more easily carried out. These basic components of geometry may often be referred to graphics "primitives", and such "primitives" are usually in the form of simple polygons, such as triangles, points, lines, etc. (or groups thereof).

Each primitive (e.g. polygon) is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and respective primitives that use those vertices. For a given frame, there may, e.g., be of the order of a few thousand draw calls, and hundreds of thousands (or potentially millions) of primitives.

Once primitives and their vertices have been generated and defined, they can be processed by the graphics processor, in order to generate the desired graphics processing output (render target), such as a frame for display. This basically involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively. (The term "rasterisation" is sometimes used to mean both primitive conversion to sample positions and rendering. However, herein "rasterisation" will be used to refer to converting primitive data to sampling point addresses only.)

One form of graphics processing uses so-called "tile-based" rendering. In tile-based rendering, the two-dimensional render output (i.e. the output of the rendering process, such as an output frame to be displayed) is rendered as a plurality of smaller area regions, usually referred to as "rendering tiles". In such arrangements, the render output is typically divided (by area) into regularly-sized and shaped rendering tiles (they are usually rectangles, e.g. squares). (Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.)

In a tile-based graphics processing pipeline, the geometry (primitives) for the render output being generated is sorted into regions of the render output area, so as to allow the geometry (primitives) that need to be processed for a given region of the render output to be identified. This sorting allows primitives that need to be processed for a given region of the render output to be identified (so as to, e.g., avoid unnecessarily rendering primitives that are not actually present in a region). The sorting process produces lists of primitives to be rendered for different regions of the render output (referred to herein as "primitive" lists but also commonly referred to as "polygon" or "tile" lists).

Once the primitive lists have been prepared for all the render output regions, each rendering tile is processed, by rasterising and rendering the primitives listed for the region of the render output corresponding to the rendering tile.

The process of preparing primitive lists for regions of the render output thus basically involves determining the primitives that should be processed for a given render output region. This process is usually carried out by determining (at a desired level of accuracy) the primitives that intersect (i.e. that will appear (at least in part) within) the render output region in question, and then preparing a list of those primitives for future use by the graphics processing system. Thus, for each primitive to be processed, the graphics processor reads in the associated vertex data, converts the vertex positions at least to screen space (vertex shading), and then determines using the shaded vertex positions for each primitive which region(s) of the render output the primitive at least partially covers (and so should therefore be rendered for).

It should be noted here that where a primitive falls into more than one render output region, as will frequently be the case, it is included in a primitive list for each region that it falls within. A render output region for which a primitive list is prepared could be a single rendering tile, or a group of plural rendering tiles, etc.

In effect, each render output region can be considered to have a bin (the primitive list) into which any primitive that is found to fall within (i.e. intersect) the region is placed (and, indeed, the process of sorting the primitives on a region-by-region basis in this manner is commonly referred to as "binning").

The primitive lists prepared in this way can then be written out, e.g., to memory, and once a first processing pass including the tiling operation is complete, such that all of the primitive lists (for all of the primitives for all of render output regions) have been prepared, the primitive lists can then be used by the graphics processor, e.g. in a second (deferred) processing pass, to perform the actual rendering of the rendering tiles, with the information stored in the primitive lists being used accordingly to identify the primitives to be rendered for each rendering tile when generating the desired render output, e.g. to display the frame.

The Applicants have recognised however that there remains scope for improvements in how such graphics processing systems are operated when performing "tile-based" rendering.

BRIEF DESCRIPTION OF THE FIGURES

Various embodiments will now be described by way of example only and with reference to the following figures, in which.

DESCRIPTION

Figure 1:
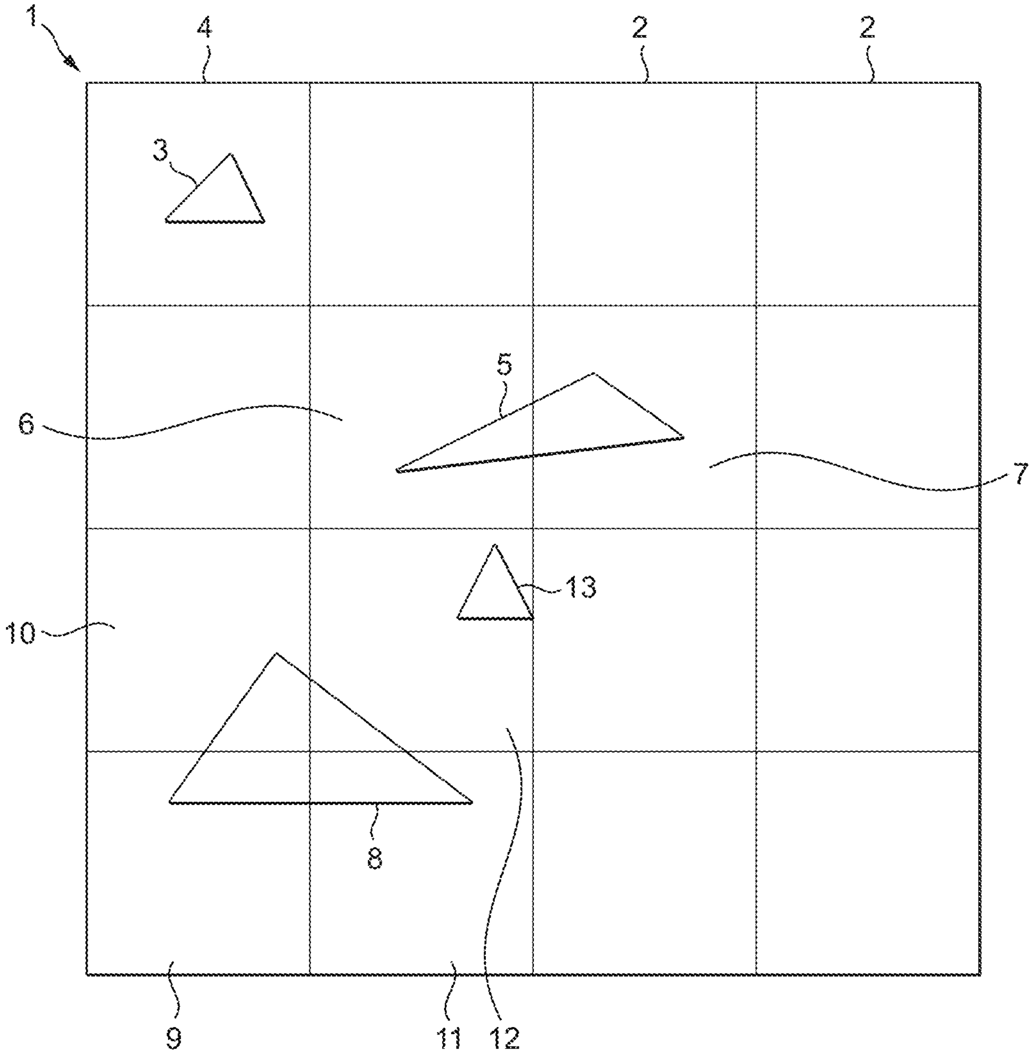
FIG. 1 shows schematically a tile-based graphics processing arrangement.

A first embodiment of the technology described herein comprises a method of processing data in a graphics processor when performing tile-based rendering in which a render output is sub-divided into a plurality of tiles for rendering, the method comprising:

performing a first processing pass to sort a sequence of primitives to be processed for a render output into respective regions of the render output, the first processing pass comprising:

determining which primitives in the sequence of primitives to be processed for the render output are to be rendered for the respective regions into which the render output is sub-divided for sorting the primitives;

preparing corresponding primitive lists for the regions of the render output, each primitive list identifying a respective list of primitives that are to be rendered for the region of the render output to which the primitive list relates; and generating, using information indicative of the positions within the render output of the primitives in the sequence of primitives, "tile elimination" data indicative of which of the tiles into which the render output is sub-divided for rendering should be rendered for the render output;

the method further comprising:

performing a second processing pass to render the tiles into which the render output is sub-divided for rendering, the second processing pass comprising:

ii. obtaining the tile elimination data indicative of which of the tiles should be rendered for the render output; and controlling the rendering of the tiles for the render output based on the tile elimination data.

A second embodiment of the technology described herein comprises a graphics processor configured to perform tile-based rendering in which a render output is sub-divided into a plurality of tiles for rendering, the graphics processor comprising:

a geometry processing circuit that is configured to perform a first processing pass for a render output to sort a sequence of primitives to be processed for the render output into respective regions of the render output, the geometry processing circuit comprising:

a sorting circuit that is operable to perform tiling operations to determine which primitives in a sequence of primitives to be processed for a render output are to be rendered for respective regions into which the render output is sub-divided for sorting the primitives;

a primitive list preparation circuit that is configured to prepare corresponding primitive lists for the regions of the render output, each primitive list identifying a respective list of primitives that are to be rendered for the region of the render output to which the primitive list relates; and a tile elimination data generating circuit that is configured to generate, using information indicative of the positions within the render output of the primitives in the sequence of primitives, "tile elimination" data indicative of which of the tiles into which the render output is sub-divided for rendering should be rendered for the render output;

the graphics processor further comprising:

a renderer circuit that is configured to perform a second processing pass to render the tiles into which the render output is sub-divided for rendering, the renderer circuit comprising:

an input circuit configured to obtain the tile elimination data indicative of which of the tiles should be rendered for the render output; and a tile rendering circuit configured to render tiles, wherein the renderer circuit is configured to control the rendering of the tiles for the render output based on the tile elimination data.

The technology described herein relates to so-called "tile-based" graphics processing in which a render output (e.g. a frame for display) is sub-divided into a plurality of (smaller) regions ("tiles") for rendering, each region (rendering tile) including a respective area of the render output. The respective regions (tiles) into which the render output is sub-divided for rendering can then be rendered separately, e.g. in parallel.

To facilitate this, the rendering operation in a tile-based graphics processor is effectively performed in two, separate processing passes.

In particular, the first processing pass effectively processes and sorts the geometry (which in the technology described herein is defined in terms of a sequence of graphics 'primitives') that is to be processed for the render output into respective different regions of the render output into which the render output is sub-divided for the purpose of sorting the primitives.

Thus, the graphics processor is configured to perform, in a first processing pass, a "tiling" operation to sort the sequence of primitives defined for the render output into the respective different regions of the render output into which the render output is sub-divided for the purpose of sorting the primitives. The tiling operation thus determines which primitives in a sequence of primitives that are to be processed for a render output need to be rendered for which of the regions into which the render output is sub-divided for the sorting (tiling) operation.

The result of this tiling operation is to generate a corresponding set of primitive lists (which are sometimes also referred to as "tile-lists", or polygon lists, but the term 'primitive lists' will primarily be used herein) that identify which of the primitives in the sequence of primitives defined for the render output are to be rendered for respective different regions of the render output.

For example, the primitives within the sequence of primitives defined for the render output will have a certain spatial distribution within the render output. The sorting (tiling) operation thus generates a set of primitive lists encoding the spatial distribution of the primitives, which primitive lists can then be used to facilitate the subsequent rendering of the rendering tiles.

In this respect, it should be noted that a given primitive list may be prepared either for a single tile or for plural tiles of the render output. In other words, the regions into which the render output is divided for sorting purposes may or may not directly correspond to the regions (i.e. "tiles") into which the render output is divided for rendering. Likewise, a given rendering tile may be associated with more than one primitive list (e.g. where the tiling operation is performed in a hierarchical manner), in which case multiple primitive lists may need to be suitably merged in order to determine which primitives are to be rendered for the rendering tile, and in which order.

Various examples are possible in this regard, e.g. depending on how the render output is divided for processing.

The graphics processor will then perform the actual rendering of the regions (rendering tiles) making up the overall render output in a second, "deferred" processing pass in which the primitives to be rendered for the different rendering tiles are identified using the respective primitive lists that were prepared in the first processing pass.

Thus, once all of the primitive lists have been prepared, and the primitives sorted into the different regions of the render output accordingly, in the first processing pass, the primitive lists can then be read back into the graphics processor for the second processing pass and used to perform the rendering of the respective rendering tiles to generate the render output, e.g. in the normal manner for a tile-based rendering system.

The technology described herein relates particularly to improved mechanisms for eliminating 'empty' rendering tiles, e.g., and in an embodiment, earlier in the graphics processing (rendering) pipeline, to reduce unnecessary processing of any such rendering tiles that do not need to be rendered by the graphics processor.

To achieve this, the technology described herein generates during the first (tiling) processing pass additional 'tile elimination' data that is indicative of which of the tiles into which the render output is sub-divided for rendering (which as discussed above may or may not correspond to the regions into which the render output is sub-divided when preparing the primitive lists) may need to be, and therefore should be, rendered for the render output. Correspondingly, the tile elimination data generated in the first (tiling) processing pass allows the graphics processor to then identify, during the second (rendering) processing pass, any tiles that definitely do not need to be rendered (and these tiles can be 'eliminated' for subsequent processing on this basis).

According to the technology described herein, the tile elimination data for a render output is generated using information indicative of the (spatial) positions within the render output of the primitives in the sequence of primitives to be processed for the render output.

For instance, as a general principle, any tiles that contain geometry (primitives) should be rendered for the render output. Thus, the tile elimination data in an embodiment reflects the spatial distribution of the primitives in the sequence of primitives defined for the render output relative to the rendering tiles.

For example, generating the tile elimination data in the technology described herein in an embodiment involves determining which of the tiles into which the render output is sub-divided for rendering contain primitives, and generating the tile elimination data accordingly.

In this respect, the technology described herein recognises that the first (tiling) processing pass in a tile-based rendering system will typically gather lots of information in this regard in order to sort the primitives, and that this information can beneficially also be used for the purposes of tile elimination.

That is, the first (tiling) processing pass in a tile-based rendering system already involves obtaining and processing all of the geometry data defined for the render output in order to sort the primitives into primitive lists, as explained above. The geometry processing (tiling) circuit that performs the first processing pass thus generally already has knowledge of the spatial distribution of the primitives. Therefore, the processing in the first (tiling) processing pass can readily be extended to also generate such tile elimination data indicative of which of the rendering tiles should be rendered.

In other words, the technology described herein recognises that it is possible to generate such data for tile elimination purposes during the first (tiling) processing pass, and further that this can be done relatively cheaply, e.g., and in an embodiment, without significant additional processing overhead in the first (tiling) process pass.

Various examples of how the additional tile elimination data of the technology described herein may be generated during the first (tiling) processing pass will be described further below.

The tile elimination data that is generated in the first (tiling) processing pass according to the technology described herein can then be (and is) used during the second (rendering) processing pass to control the rendering of the tiles for the render output, and in particular to eliminate 'empty' tiles from subsequent processing, e.g., and in an embodiment, relatively earlier in the second (rendering) processing pass.

For instance, in the technology described herein, the tile elimination data is in an embodiment stored in a tile elimination data structure that is stored separately and in addition to the primitive lists themselves.

In embodiments the tile elimination data structure can therefore be (and is) obtained by the graphics processor in the second processing pass independently of the primitive lists, e.g., and in an embodiment, at the start of the second (rendering) processing pass.

Correspondingly, this means that the tile elimination operation can therefore in an embodiment also be performed relatively earlier, e.g. at the start of the second (rendering) processing pass ('early tile elimination'), e.g., and in an embodiment, before the tiles are issued for rendering, and before any other data such as the primitive lists that may need to be obtained to perform the rendering operations is obtained.

The effect of all this is therefore to in an embodiment facilitate an earlier elimination of any 'empty' tiles that do not need to be rendered, thereby reducing unnecessary processing (e.g. rendering) of any such tiles in the second (rendering) processing pass.

For instance, when generating a render output, it is often the case that some regions will not be rendered to, i.e. they should remain unchanged. In such cases, it is desirable to perform as little processing as possible on tiles covering those regions. Thus, it is desirable to be able to determine that a given tile is 'empty' (does not need to be rendered) as early as possible, such that the tiles can be eliminated from subsequent processing accordingly, e.g. at an appropriate (early) position in the second (rendering) processing pass.

The technology described herein provides an efficient mechanism for doing this, where information gathered during the first processing pass (i.e. the tiling operation) in a tile-based rendering system is used to generate tile elimination data that can be used to perform earlier tile elimination.

For example, in some existing systems, when performing fragment shading in the final stages of the rendering pipeline, if it is determined that there are no fragments to be rendered for a particular tile, the processing of the tile can then be stopped at that point (in the fragment shader endpoint). This can work well in many cases to save unnecessary fragment shading for empty tiles. However, the rendering tiles are still processed in the rendering pipeline up to that point. Further, performing tile elimination in the fragment shader endpoint may introduce processing 'bubbles' in the fragment shader, e.g. as the tiles are still submitted to the fragment shader endpoint before they are culled (such that especially if there are lots of empty tiles that are adjacent to one another, the shader core may then be idle for a number of processing cycles whilst it waits for a tile that does contain fragments to be processed).

In the technology described herein, on the other hand, the data that is used for tile elimination (the "tile elimination" data) is generated upfront, during the first processing pass, which in turn may, e.g., and in an embodiment does, facilitate earlier tile elimination, as tiles that do not need to be processed can be eliminated in the second (rendering) processing pass, e.g., and in an embodiment, relatively earlier in the second (rendering) processing pass, e.g., and in an embodiment, at the start of the second (rendering) processing pass.

The technology described herein can therefore provide a more efficient use of processing (rendering) resource in the second processing pass by allowing earlier elimination of 'empty' tiles. Further, the additional tile elimination data of the technology described herein that is generated in the first (tiling) processing pass can be generated in a relatively efficient (and cheap) manner, since this can be done alongside the other (normal) geometry processing that is to be performed in the first (tiling) processing pass.

The technology described herein may therefore provide various benefits compared to other approaches.

The tile elimination data in the technology described herein may indicate which tiles for a render output should be rendered in any suitable and desired manner.

For example, in embodiments, the tile elimination data for a render output indicates a set of one or more tiles that should be rendered for the render output. However, this set of tiles may, e.g., and in an embodiment does, comprise a subset of less than all of the tiles into which the render output was sub-divided for rendering.

Thus, as will be explained further below, the tile elimination data for a render output in an embodiment facilitates the graphics processor rendering only a reduced subset of tiles for the render output, e.g. as identified from the tile elimination data (with other tiles that are not indicated to be rendered in an embodiment being eliminated based on the tile elimination data).

The tile elimination data thus in an embodiment allows a positive identification of the (subset of) tiles that should be rendered. However, it would also be possible for the tile elimination data to instead (or additionally) identify the (subset of) tiles that should be eliminated. In that case, in order to control the rendering of tiles, the graphics processor may, e.g., check the tile elimination data to determine whether the current tile should be eliminated, and, if so, stop processing for that tile (and move onto the next tile).

Various arrangements would be possible in this regard.

The tile elimination data in the technology described herein may be stored in any suitable tile elimination data structure, as desired. Correspondingly, the tile elimination data structure may take any suitable and desired form.

For example, where the tile elimination data indicates a subset of, e.g., less than all of, the tiles that should be rendered (or equivalently a subset of tiles that can be eliminated), the tile elimination data may only indicate those tiles (such that for the other tiles the absence of any indication for that tile controls how the tile is processed).

In embodiments, the tile elimination data indicates for each of the tiles into which the render output is sub-divided for rendering whether or not the tile should be rendered, e.g. on a 'per tile' basis. In an embodiment, therefore, a binary indication is stored in respect of each tile such that for each tile it is indicated either that the tile should be rendered or that the tile can be eliminated.

The tile elimination data thus in an embodiment comprises a set of 'per tile' indications, with a respective indication being stored for each rendering tile. The data structure for storing such per tile indications can take various suitable forms, as desired. In an embodiment the tile elimination data (e.g. the set of per tile indications) is stored using a suitable bitmap, e.g. with the bit positions in the bitmap corresponding to individual rendering tiles and the respective bit values being set accordingly based on whether or not the corresponding tile should be rendered. However, other arrangements would be possible.

In some embodiments the set of 'per tile' indications may be generated and stored in a strictly one to one manner with the rendering tiles. That is, each (and every) rendering tile may be processed individually to generate a respective indication as to whether or not the tile should be rendered, and (only) a single indication stored for each tile.

Other arrangements would however be possible. For instance, the tile elimination data may, e.g., be, and in some embodiments is, generated and/or stored in a hierarchical manner.

In that case, the tile elimination data in an embodiment still indicates for each (and every) tile whether the tile should be rendered, such that a set of 'per tile' indications are effectively provided, but indications can also be provided for larger area regions encompassing groups of plural tiles (e.g., and in an embodiment, at different levels of the hierarchical structure). Thus, the top level of the hierarchical structure may encompass the whole render output, such that if none of the tiles should be rendered, this can be indicated accordingly at that level. The render output can then be sub-divided, e.g. into quadrants, to define corresponding regions at each level of the hierarchy down to the level of the rendering tiles at the lowest level of the hierarchy, with respective indications provided at the different levels.

Storing the tile elimination data in a hierarchical manner can in some embodiments facilitate a more efficient generation of the tile elimination data structure. For example, once it is determined that a region for which an indication is stored in a higher level of the hierarchy that covers a groups of plural tiles in the lower level(s) of the hierarchy does not need to be rendered, this result can then be copied down to the lower level(s) of the hierarchy accordingly. This then saves having to explicitly check each of the individual rendering tiles in the group of tiles that are covered by the higher level region. The use of a hierarchical tile elimination data structure can therefore help accelerate the generation of the tile elimination data structure during the first (tiling) processing pass.

In a similar manner, the use of a hierarchical tile elimination data structure can also facilitate using the tile elimination data structure to more effectively control the rendering of the tiles in the second (rendering) processing pass. For example, once it is determined that a region for which an indication is stored in a higher level of the hierarchy that covers a set of plural tiles in the lower level(s) of the hierarchy does not need to be rendered, the graphics processor can eliminate the entire region at that point, without individually checking each of the tiles that are covered by that region. Therefore, a hierarchical arrangement can again help speed up the iteration over the tile elimination data structure to determine which rendering tiles should be rendered when the tile elimination data structure is consumed in the second (rendering) processing pass.

Various other arrangements would be possible for storing the tile elimination data.

The tile elimination data can be generated in any suitable and desired manner. Various embodiments for generating the tile elimination data will now be described but other arrangements would of course be possible.

In embodiments, generating the tile elimination data comprises performing, during the first processing pass, a tile elimination data generating operation to determine which of the tiles into which the render output is sub-divided for rendering should be rendered.

For instance, as mentioned above, in embodiments, the tile elimination data indicates, e.g. on a per tile, basis whether or not a rendering tile should be rendered.

This can be determined in various suitable ways. In an embodiment this involves determining, by the tile elimination data generating operation, which of the tiles into which the render output is sub-divided for rendering contain geometry (primitives). For instance, any tiles that contain (or potentially contain) geometry should always be rendered and this should therefore be indicated accordingly in the tile elimination data.

Whether or not a tile contains geometry can be determined in various suitable manners, as desired.

In a first main embodiment this is determined by suitably iterating over the generated primitive lists to determine which rendering tiles contain geometry (primitives). In an embodiment this tile elimination data generating operation is performed after all of the primitives have been processed to determine which of the regions into which the render output is sub-divided for sorting the primitives fall inside.

In an embodiment, therefore, during the first (tiling) processing pass, after the primitives have been sorted into different regions of the render output to prepare the primitive lists, the graphics processor is configured to perform a further tile elimination data generating operation that iterates over the primitive lists to determine which rendering tiles contain primitives (and which rendering tiles accordingly need to be rendered).

As mentioned above, this determination may be made strictly on a tile by tile basis, or may be performed in a hierarchical manner.

The tile elimination data generating operation to determine which tiles contain geometry (primitives) may be a separate, e.g. standalone, operation that is performed after the primitive lists have been prepared (and finalised, as necessary).

For instance, the tile elimination data generating operation in that case may be implemented by a suitable compute shader program after the tiling operation is finished, e.g. at the end of the first processing pass. This tile elimination data generating operation can therefore in an embodiment be performed using a relatively lightweight shader program, e.g. as the tile elimination data generating operation in an embodiment simply iterates over the primitive lists to determine which rendering tiles contain primitives, but does not perform any further geometry processing (vertex shading), etc., and so the tile elimination data can in an embodiment be generated without adding significant processing overhead to the first (tiling) processing pass.

In some embodiments, however, rather than performing a separate tile elimination data generating operation at the end of the first (tiling) processing pass, the tile elimination data generating operation may be performed as part of a, e.g., 'finalisation' operation for the primitive lists.

For example, in an embodiment, after the sorting of the primitives to prepare the primitive lists, a primitive list 'finalisation' operation is then performed to finalise the primitive lists, e.g. to facilitate writing out of the primitive lists. This finalisation operation may be performed to, e.g., add suitable 'end' pointer commands to the primitive lists. In an embodiment, the end pointer commands that are added during this finalisation operation are therefore also used to determine which tiles (or regions) contain primitives to build a suitable per-tile tile elimination data structure.

A benefit of the approach according to the first main embodiment therefore is that it may in any case be necessary to perform such iteration over the primitive lists, e.g. to perform such primitive list 'finalisation' operations to add suitable end pointer commands to the primitive lists, and the additional determinations of the indications whether or not the tiles should be rendered (the tile elimination data) can therefore be made relatively cheaply, during this finalisation operation. This may therefore be very efficient.

The result of the tile elimination data generating operation in the first main embodiment is therefore in an embodiment a set of per tile indications, one for each tile (or region in a hierarchy), indicating whether or not the tile (region) contains any primitives. This tile elimination information may be stored in any suitable manner, e.g., and in an embodiment, using a tile elimination data structure, e.g. a bitmap, as explained above, such that it can be obtained (and used) by the graphics processor for the second (rendering) processing pass.

Thus, in a first main embodiment, the tile elimination data is generated by performing a tile elimination data generating operation that uses the prepared primitive lists to determine which of the tiles into which the render output is sub-divided for rendering contain geometry (primitives) and should therefore be rendered. In this case, the tile elimination data generating operation using the prepared primitive lists is in an embodiment performed as part of a, e.g., 'finalisation' operation for the primitive lists, e.g., that adds suitable end pointer commands to the primitive commands and at the same time generates indications as to which tiles contain primitives.

Other approaches would however be possible for generating the tile elimination data using the primitive lists.

For example, rather than performing a separate tile elimination data generating operation, e.g. at the end of the first (tiling) processing pass, the graphics processor could instead track, during the first (tiling) processing pass, whilst preparing the primitive lists, which rendering tiles contain geometry (primitives), and then store indications of this in a suitable tile elimination data structure (e.g. a bitmap or other suitable data structure). That is, the tile elimination data structure in the first main embodiment could instead be generated 'on the fly', e.g., and in embodiments, alongside the preparing of the primitive lists. This approach also works well but may require multiple read-modify-write operations to dynamically update the tile elimination data structure during the first (tiling) processing pass, e.g. as opposed to performing a single tile elimination data generating operation once the primitive list preparation is finished.

Other arrangements would also be possible for generating the tile elimination data that do not use the primitive lists as such.

For example, in a second main embodiment, rather than performing a tile elimination data generating operation using the primitive lists, a cumulative bounding box is generated and maintained during the processing of the primitives in the first (tiling) processing pass, and this cumulative bounding box is then used to determine whether or not the tiles should be rendered, e.g., and in an embodiment, on a tile by tile basis.

Thus, in the second main embodiment, the graphics processor generates during the first (tiling) processing pass a 'cumulative' bounding box that eventually encompasses all of the primitives (geometry) for the render output.

For example, the normal tiling operations in the first (tiling) processing pass may in some embodiments determine a bounding box per primitive and then use the per-primitive bounding box to assign the primitive to the regions (primitive lists) on this basis (binning). In that case, if a given region is not assigned any primitives, there is no need to render it.

In the second main embodiment, this idea is extended so that a separate cumulative bounding box is maintained for the purposes of generating the tile elimination data of the technology described herein. Thus, each time a new primitive is processed, the cumulative bounding box is expanded (if necessary) to encompass the new primitive, and so on.

Generating the cumulative bounding box thus in an embodiment comprises, whilst processing (sorting) the primitives into the primitive lists, maintaining a cumulative bounding box that encompasses all of the primitives in the sequence of primitives up to the current primitive. When a new primitive in a sequence of primitives defined for a render output is received to be processed, the method thus in an embodiment comprises extending the bounding box (if necessary) to encompass the new primitive, in a cumulative manner.

The result of this is that when all of the primitives in the sequence of primitives defined for the render output have been processed, the cumulative bounding box will encompass everything on screen. The cumulative bounding box thus indicates which regions of the render output potentially contain primitives. Any regions that fall inside the cumulative bounding box should therefore be rendered, as they potentially contain primitives that will need to be rendered.

Once all of the primitives have been processed, and a suitable cumulative bounding box encompassing all of the primitives has been generated accordingly, a tile elimination data generating operation can then be performed using the cumulative bounding box to determine, for each tile, whether or not the tile should be rendered. In this case, the tile elimination data generating operation in an embodiment involves testing the tiles against the cumulative bounding box to determine which tiles intersect the cumulative bounding box. As above, this testing may be performed at the level of the individual tiles, but may also be performed in a hierarchical manner, by testing larger regions.

Any tiles (regions) that intersect the cumulative bounding box may potentially contain geometry (primitives), and should therefore be rendered on this basis.

On the other hand, it can be ensured that any regions falling outside of the cumulative bounding box definitely do not contain any primitives, and therefore any tiles that do not intersect the cumulative bounding box may not need to be rendered such that they can potentially be eliminated (although as will be explained further below there may be other conditions that need to be taken into account before determining that a tile can be safely eliminated).

Accordingly, in the second main embodiment a similar set of, e.g. per tile, indications can be generated, and stored, e.g. using a bitmap, or other suitable data structure, as in the first main embodiment. However, in this case, rather than determining whether the tile contains geometry using the primitive lists, as in the first main embodiment, the indications as to whether a tile (potentially) contains geometry are instead determined based on whether (or not) the tile intersects a cumulative bounding box for the render output.

Thus, according to the second main embodiment, generating the tile elimination data (e.g. the set of per tile indications) comprises generating, during the first processing pass, a cumulative bounding box for the render output, the cumulative bounding box encompassing all of the primitives in the sequence of primitives defined for the render output. A suitable tile elimination data generating operation is then performed, using the cumulative bounding box, comprising testing regions of the render output for intersection with the cumulative bounding box to determine which of the tiles into which the render output is sub-divided for rendering intersect the cumulative bounding box and therefore should be rendered.

A benefit of the approach according to the second main embodiment using a cumulative bounding box is that the graphics processor may already be configured to handle such bounding box operations, e.g. as part of the normal tiling operations, and so again this can in an embodiment be implemented with relatively little additional processing complexity. This approach can also work well in many cases to perform tile elimination, especially since primitives are often grouped together on the screen.

However, the use of a cumulative bounding box is a relatively coarser approach to determine which regions may contain geometry (primitives). For instance, the cumulative bounding box may be generated in a conservative manner such that the cumulative bounding box encompasses not only tiles containing geometry but also intervening tiles to complete the 'box'. This also means that an isolated primitive (e.g. in the corner of the render output) may cause the graphics processor to render a larger region of the render output than is necessary, e.g. as the cumulative bounding box will need to be expanded to cover this isolated primitive, even when there are lots of other empty areas that could in principle be eliminated. The cumulative bounding box therefore only indicates at best which tiles potentially contain geometry.

Thus, the approach according to the first main embodiment in which the primitive lists are used to determine which tiles contain geometry (primitives) may provide finer-grained control of the rendering of tiles, and therefore more effective early tile elimination, compared to using a cumulative bounding box.

In each of the two main examples described above, a tile elimination data generating operation is performed, e.g., and in an embodiment, at the end of the first (tiling) processing pass, to generate respective indications for each of the tiles as to whether or not the tiles contain geometry (primitives) (and therefore should be rendered).

For instance, as mentioned above, as a general principle, when rendering a, e.g., frame for display, any tiles that contain geometry (primitives) should always be rendered. That is, whenever a tile contains geometry (primitives), it is generally necessary to render that tile, and the tile elimination data accordingly can indicate this.

Thus, the examples described so far primarily describe how to determine which tiles contain primitives and using this determination to generate corresponding tile elimination data.

The technology described herein recognises however that there may be other conditions that also need to be considered when determining whether or not a tile should be rendered (or conversely to determine whether or not a tile can be safely eliminated).

That is, in some cases, even when it is determined that a tile does not contain any geometry to be rendered, it may nonetheless still be necessary to render the tile, e.g. if it cannot be guaranteed that an output has not changed for that tile.

For instance, an example of such condition would be when there is a 'clear (colour)' command, e.g. that is configured to clear the entire tile, e.g., to a single colour value. Such commands may, for example, be included at the start of a render pass, in order to clear certain regions of the render output. In that case, there may be no geometry in the rendering tile, but if it cannot be guaranteed that the rendering tile has the correct clear value, the tile will need to be rendered anyway to clear it to the correct colour value.

That is, when such clear operations are to be performed, the tile will need to be rendered if it cannot be guaranteed that the tile has the correct 'clear' (colour) value, regardless of whether or not the tile contain any geometry.

In such cases, the tile elimination mechanism technology described herein could simply be disabled whenever such conditions are encountered. Thus, in some embodiments, whenever there are tiles that may need to be rendered regardless of whether or not they contain geometry (primitives) (e.g. due to the presence of a 'clear' command, or because there is another output that may need to be generated/updated by rendering the tile), the tile elimination data is ignored, and the rendering circuit simply renders all of the rendering tiles, e.g. in the normal manner, without attempting to perform tile elimination.

However, in embodiments, the graphics processor can, and in an embodiment does, also take these conditions into account when generating the tile elimination data during the first (tiling) processing pass To facilitate this, in embodiments, the graphics processor further determines, during the first (tiling) rendering pass which tiles may need to be rendered regardless of whether or not they contain geometry (primitives).

Thus, in embodiments, generating the tile elimination data structure comprises a further step of checking other conditions to determine whether the tiles need to be rendered regardless of whether or not they contain geometry (primitives).

In an embodiment, therefore, generating the tile elimination data effectively involves a two-step determination, including a first step to determine which tiles contain geometry (primitives) (and therefore need to be rendered) and a second step to determine which tiles need to be rendered regardless of whether or not they contain geometry (primitives). This information is in an embodiment then combined to give a single, overall tile elimination data structure indicating which rendering tiles should be rendered (either because they contain geometry (primitives) or because there is some other reason that they need to be rendered even if they do not contain any geometry).

The determination of which tiles may need to be rendered regardless of whether or not they contain geometry (primitives) may be performed in any suitable and desired manner.

For example, and in an embodiment, this can be done using per tile 'signatures' (e.g., and in an embodiment, in the form of a cyclic redundancy check, CRC, value) that indicate whether or not an output for the tile has been modified, e.g. since the previous rendering operation (e.g. for a previous frame), together with an indication of the last colour value used to clear the tile. It can thus be checked whether the current signature (CRC value) matches the value calculated based on the last colour value used to clear the tile. If the signatures do not match, this means that it cannot be guaranteed that the tile has the correct clear colour value and so the tile should be rendered. An indication of this can thus be generated and stored appropriately for the tile elimination data.

To facilitate tracking this, a 'CRC buffer' may be stored that indicates, e.g. on a per tile basis, whether or not the tile was cleared during the previous rendering operation (e.g. for the previous frame). For example, if a tile was cleared during the previous rendering operation, and is also cleared during the current operation, it can be ensured that the tile will have the correct clear colour value. Thus, so long as the tile does not contain any geometry (primitives), the tile may then be safely eliminated. Various arrangements would be possible for storing and tracking this information.

In some cases, a tile may also be cleared mid-render pass, e.g., by causing the graphics processor to draw a 'full screen' primitive that renders to every tile. These full screen primitive commands are in an embodiment handled in the same way as the clear commands above. That is, full screen primitives (commands) are in an embodiment treated exceptionally as conditions that may mean that a tile needs to be rendered regardless as to whether or not it contains geometry, rather than being treated as normal (i.e. user drawn) primitives (otherwise the presence of a single full screen primitive may cause the entire render output to always be rendered, without any possibility for tile elimination). For instance, the driver is able to flag a full screen primitive (command) that the full screen primitive should not be treated as normal geometry. The tiler can thus determine using this flag that the command relates to a full screen primitive and process the primitive accordingly (and disregard it for the purposes of tiling, for example).

Another example of where a tile may need to be rendered regardless of whether or not it contains geometry (primitives) is where generating the overall render output, e.g. a frame for display, involves generating multiple different outputs. For instance, in addition to populating the frame buffer, the second (rendering) processing pass may also populate depth and/or stencil buffers for the render output. These buffers could simply be discarded at the end of a render pass but in some cases it may be desirable to retain some of this information between rendering operations. Thus, even if there is no geometry (primitive) within a tile, such that the frame buffer will not be updated, if it cannot be guaranteed that there are no other outputs such as a depth and/or stencil buffer that may need to be updated, the tile may still need to be rendered accordingly.

This may be achieved in a similar manner as described above, e.g. by storing a suitable set of signatures (e.g. a respective CRC buffer) for each output associated with the overall processing of the render output, e.g., frame, in the second (rendering) processing pass. It can thus be checked for each output, e.g. using the respective CRC values (for the current and previous render passes), whether there are any tiles that may need to be rendered regardless of whether or not they contain geometry (primitives). Any tiles for which it cannot be guaranteed that an output has not changed may not be safely eliminated and thus may need to be issued for rendering. The tile elimination data thus in an embodiment indicates this accordingly such that the graphics processor is controlled to also render those tiles during the second (rendering) processing pass regardless of whether it was determined that they do or do not contain geometry (primitives).

The determination of which tiles may need to be rendered regardless of whether or not they contain geometry (primitives) could be performed only for the subset of tiles that do not contain geometry (primitives) (to save processing since it is known that the tiles that do contain geometry (primitives) will always need to be rendered in any case).

In some embodiments, however, it is determined for all tiles in the render output whether or not there is some reason that the tiles should be rendered regardless of whether or not it contains geometry. In that case, the graphics processor may generate a corresponding set of 'per tile' indications indicating for each tile whether or not the tile needs to be rendered regardless of whether or not the tile contains geometry (for any reason, whether that is, e.g., due to the presence of a 'clear' command, or because there is another output that may need to be generated/updated by rendering the tile).

These per tile indications are in an embodiment then combined with the per tile indications of whether or not the tile contains geometry to generate a single tile elimination data structure that indicates all of the tiles that should be rendered (whether that be because they contain geometry (primitives) or because they need to be rendered in any case, despite not containing any geometry).

For example, as discussed above, the per tile indications as to whether or not the tiles contain geometry (primitives) may be stored using a bitmap. A corresponding bitmap can then be generated indicating, on a tile by tile basis, whether or not the tiles need to be rendered regardless of whether or not they contain geometry (primitives). The two bitmaps can then be suitably combined, e.g. using an 'OR' operation, to generate a final tile elimination data structure (bitmap) indicating whether or not each tile should be rendered (for any reason).

Thus, in embodiments, at least for the tiles that are not determined to contain geometry (primitives), it is further determined whether or not the tile should be rendered regardless. In an embodiment, the tile elimination data is then updated accordingly such that any tiles that do not contain geometry (primitives) but need to be rendered regardless are indicated as such in the tile elimination data (in addition to the tiles that need to be rendered since they contain primitives).

The use of per tile indications (e.g. in the form of a tile elimination 'bitmap' or other suitable data structure) as to which tiles should be rendered, e.g. as generated in the first and second main embodiments above may thus be particularly beneficial in this regard since this allows the graphics processor to more easily take into account various different conditions, on a tile by tile basis, when determining whether or not a given tile should be rendered.

That is, after generating a suitable set of per tile indications as to which tiles contain geometry (primitives), it is possible to update the per tile indications accordingly, e.g., to take into account any other conditions (such as whether there is a 'clear' command) that may mean that the tile still needs to be rendered.

A single combined tile elimination data structure may thus be provided that takes into account any (and all) such conditions that may mean that a tile should be rendered, and provides suitable 'per tile' indications of this accordingly to facilitate tile elimination.

However, the tile elimination data could in other embodiments have a different form entirely, so long as it allows the graphics processor to suitable determine during the second (rendering) processing pass which tiles should be rendered, and perform tile elimination accordingly.

For example, rather than using the cumulative bounding box to generate a set of per tile indications, as described above, in some embodiments, a cumulative bounding box may be generated, e.g. in a similar fashion as in the second main embodiment above, but rather than performing a further tile elimination data generating operation using the cumulative bounding box, the cumulative bounding box may itself be directly output from the first (tiling) processing pass for use as tile elimination data. This has a possible benefit that second (rendering) processing pass may already be configured to use bounding box culling, and so can handle the tile elimination in a similar way.

Thus, in some embodiments, a cumulative bounding box is generated, e.g. as described above, during the first (tiling) processing pass, but the cumulative bounding box is itself then written out, e.g., to memory, and then used by the graphics processor in the second (rendering) processing pass to determine which rendering tiles should be rendered, and to control the rendering of tiles accordingly.

In that case, rather than performing a further tile elimination data generating operation using the cumulative bounding box during the first (tiling) processing pass (e.g. to generate a set of per tile indications), for example, the graphics processor may be configured to test the tiles for intersection with the cumulative bounding box during the second (rendering) processing pass. This in an embodiment still facilitates overall earlier tile elimination, e.g. as the testing against the cumulative bounding box may, e.g., be, and in an embodiment is, performed at the start of the rendering pipeline.

However, in this case, if there is any other tile elimination information, or conditions that need to be considered to determine whether or not a tile can be safely eliminated, this may need to be indicated separately, as the cumulative bounding box will only indicate which tiles (potentially) contain geometry (primitives). Various arrangements would be possible in this regard. Alternatively, if any other conditions apply that mean that tiles may need to be rendered even when they do not contain geometry (primitives), the tile elimination mechanism could simply be disabled, e.g. such that the cumulative bounding box is discarded whenever such conditions are encountered.

In each of the embodiments described so far, and in an embodiment, the tile elimination data is stored separately and in addition to the primitive lists themselves.

As discussed above, this can facilitate earlier tile elimination, e.g. as the tile elimination data can be obtained independently of the primitive lists, before any rendering is performed. Thus, in embodiments it is desired to store the tile elimination data using a separate data structure, as this can facilitate the tile elimination being performed earlier in the second (rendering) processing pass, e.g. at the start of the second (rendering) processing pass, before the tiles are issued for rendering (and, so, without having to obtain the primitive lists).

It is also contemplated however that in other embodiments the tile elimination data may be stored in association with, or as part of, the primitive lists. For example, a suitable data field in the primitive list may be used (or re-purposed) to store an indication as to whether or not the region to which the primitive list corresponds should be rendered. For instance, this could be indicated using an appropriate bit, e.g., in a header for the primitive list. In that case, the tile elimination data is stored in a data field of the primitive lists (e.g. in the header data structure).

In that case, the graphics processor would need to read in the primitive lists (or at least the headers for the primitive lists) in order to perform tile elimination.

However, this may still facilitate relatively earlier tile elimination in the second (rendering) processing pass, e.g., and in an embodiment, during the primitive list reading. For example, the primitive list reader can determine from the associated primitive list or lists for a given rendering tile whether or not the tile should be rendered and control the rendering operations accordingly.

Various other arrangements would be possible for generating and storing the tile elimination data that is generated during the first (tiling) processing pass.

The technology described herein also extends to the generation of the tile elimination data during the first (tiling) processing pass per se.

Accordingly, another embodiment of the technology described herein comprises a method of processing data in a graphics processor when performing tile-based rendering in which a render output is sub-divided into a plurality of tiles for rendering, the method comprising:

- performing a first processing pass to sort a sequence of primitives to be processed for a render output into respective regions of the render output, the first processing pass comprising:
  - determining which primitives in the sequence of primitives to be processed for the render output are to be rendered for the respective regions into which the render output is sub-divided for sorting the primitives;
  - preparing corresponding primitive lists for the regions of the render output, each primitive list identifying a respective list of primitives that are to be rendered for the region of the render output to which the primitive list relates; and
  - generating, using information indicative of the positions within the render output of the primitives in the sequence of primitives, tile elimination data indicative of which of the tiles into which the render output is sub-divided for rendering should be rendered for the render output and usable during a second processing pass to control the rendering of the tiles for the render output.

A further embodiment of the technology described herein comprises a graphics processor configured to perform tile-based rendering in which a render output is sub-divided into a plurality of tiles for rendering, the graphics processor comprising:

- a geometry processing circuit that is configured to perform a first processing pass for a render output to sort a sequence of primitives to be processed for the render output into respective regions of the render output, the geometry processing circuit comprising:
  - a sorting circuit that is operable to perform tiling operations to determine which primitives in a sequence of primitives to be processed for a render output are to be rendered for respective regions into which the render output is sub-divided for sorting the primitives;
  - a primitive list preparation circuit that is configured to prepare corresponding primitive lists for the regions of the render output, each primitive list identifying a respective list of primitives that are to be rendered for the region of the render output to which the primitive list relates; and
  - a tile elimination data generating circuit that is configured to generate, using information indicative of the positions within the render output of the primitives in the sequence of primitives, tile elimination data indicative of which of the tiles into which the render output is sub-divided for rendering should be rendered for the render output and usable during a second processing pass to control the rendering of the tiles for the render output.

As will be appreciated by those skilled in the art, these further embodiments of the technology described herein can, and in an embodiment do, comprise any one or more or all of the optional features of the technology described herein described herein, as appropriate.

Thus, in embodiments, the method according to this further embodiment further comprises performing a second processing pass to render the tiles into which the render output is sub-divided for rendering, the second processing pass comprising: obtaining the tile elimination data indicative of which of the tiles should be rendered for the render output; and controlling the rendering of the tiles for the render output based on the tile elimination data.

Correspondingly, the graphics processor in an embodiment comprises a renderer circuit that is configured to perform a second processing pass to render the tiles into which the render output is sub-divided for rendering, the renderer circuit comprising: an input circuit configured to obtain the tile elimination data indicative of which of the tiles should be rendered for the render output; and a tile rendering circuit configured to render tiles, wherein the renderer circuit is configured to control the rendering of the tiles for the render output based on the tile elimination data.

The tile elimination data that is generated during the first (tiling) processing pass can then be (and is) consumed in the second (rendering) processing pass and used to control the rendering of tiles in the second (rendering) processing pass, e.g., and in particular, to eliminate 'empty' tiles from subsequent processing.

The graphics processor thus uses the tile elimination data to control which rendering tiles should be rendered in the second (rendering) processing pass.

The control of the rendering of the tiles using the tile elimination data can be performed in various suitable manners, e.g. depending on the form of the tile elimination data and/or when it is obtained during the second (rendering) processing pass.

In an embodiment the control of the rendering of the tiles is performed to reduce processing of any tiles that do not need to be rendered, e.g., such that any such 'empty' tiles are in an embodiment eliminated as early as possible during the second (rendering) processing pass.

For example, as mentioned above, the tile elimination data is in an embodiment stored in a tile elimination data structure that is stored separately and in addition to the primitive lists. Thus, the tile elimination data structure can in an embodiment be obtained independently, and in advance, of the primitive lists (e.g. and any other information such as state data that may be required to render the primitives) and used to perform early tile elimination, to try to reduce any subsequent unnecessary processing (rendering) for any tiles that do not need to be rendered.

In embodiments the tile elimination data is therefore obtained at the start of the second (rendering) processing pass, e.g., and in an embodiment, before the primitive list reading, and before any subsequent rendering operations are performed.

In this respect, the technology described herein recognises that by generating separate tile elimination data upfront, during the first (tiling) processing pass, this means that the tile elimination data can essentially be read back in at any time, and so in embodiments it is read in at the start of the second (rendering) processing pass, and then used to control the issuing of tiles into the rendering pipeline, as this provides maximum benefit in reducing unnecessary processing of tiles that do not need to be rendered.

Thus, in embodiments, the tile elimination data is obtained, during the second (rendering) processing pass, by a scheduling circuit of the rendering circuit of the graphics processor, which scheduling circuit is configured to control the issuing of tiles into the rendering pipeline (the tile rendering circuit). For example, the input circuit that obtains the tile elimination data may comprise a, e.g., command stream frontend for the rendering circuit that is operable to manage the scheduling of the overall rendering operations. The control of the rendering of tiles using the obtained tile elimination data (the tile elimination) is thus in an embodiment performed by the scheduling circuit (e.g. command stream frontend) such that any tiles that do not need to be rendered are not issued into the rendering pipeline for rendering, thus completely saving processing (rendering) of 'empty' tiles in the second (rendering) processing pass.

Thus, in an embodiment, the graphics processor (scheduling circuit) uses the tile elimination data during the second (rendering) processing pass to control which rendering tiles should be issued for rendering. In this way, the graphics processor can be controlled to selectively render only those tiles that the tile elimination data indicates should be rendered (and correspondingly to not render any other tiles).

Thus, in an embodiment, when performing the second (rendering) processing pass, prior to issuing any rendering tiles for rendering, the graphics processor is in an embodiment configured to first obtain the tile elimination data for the current render output and to use this data to control which (if any) of the rendering tiles for the render output should be rendered.

The graphics processor in an embodiment then controls the issuing of rendering tiles to the rendering pipeline based on the tile elimination data, e.g., and in an embodiment, such that only those rendering tiles that are indicated to be rendered by the tile elimination data are issued for rendering. Any other rendering tiles that the tile elimination data indicates do not need to be rendered can thus be (and in an embodiment are) eliminated, e.g., at this point ('early tile elimination'), without any further processing for these rendering tiles (such that in embodiments the primitive list(s) for those tiles are not obtained, for example).

The rendering tiles that survive this early tile elimination operation can then be issued for rendering and rendered in the normal way, e.g. by obtaining the associated primitive list or lists associated with the regions covered by the rendering tiles in question, and then using the primitive lists to determine which primitives should be rendered for which of the rendering tiles.

The graphics processor is thus in an embodiment configured to perform tile elimination as early as possible, e.g., and in an embodiment, before the tiles are issued into the rendering pipeline, e.g., and so, without having to read in the primitive lists.

Other arrangements would however be possible and in general the tile elimination data can be read in at any suitable and desired point during the second (rendering) processing pass. That is, the input circuit that obtains the tile elimination data may be provided at any suitable and desired position within the rendering circuit (rendering pipeline). Correspondingly, a tile elimination operation using the tile elimination data generated according to the technology described herein can in principle be performed at any suitable position in the rendering pipeline as desired. That is, as discussed above, a benefit of generating this information upfront, during the first (tiling) processing pass, is that it can be used as and when desired. For instance, even if tile elimination is not performed upfront, in the scheduling circuit (e.g. command stream frontend) to prevent 'empty' tiles being issued for rendering, the graphics processor can in an embodiment still eliminate 'empty' tiles relatively earlier in the pipeline, e.g. during primitive list reading, thereby avoiding issuing rendering tiles to the other subsequent processing stages, e.g., to the fragment shader endpoint.

As mentioned above, the tile elimination data generated during the first (tiling) processing pass needs to be communicated to the graphics processor (rendering circuit) for use during the second (rendering) processing pass.

Once the tile elimination data has been generated by the first (tiling) processing pass, in whatever form it takes, the tile elimination data is thus suitably stored in such a manner that it can subsequently be obtained by the graphics processor during the second (rendering) processing pass to enable the graphics processor to perform the early tile elimination of the technology described herein above. The tile elimination data can be stored in various suitable ways as desired.

In an embodiment, the tile elimination data is stored in memory, e.g. by writing the tile elimination data out to memory during the first (tiling) processing pass. The graphics processor can then obtain (fetch) the tile elimination data from its location in memory accordingly during the second (rendering) processing pass.

In an embodiment the tile elimination data is stored in an external, e.g. main, memory. However, it would also be possible to store tile elimination data more locally to the graphics processor, e.g. in a cache system, if that were desired. Other suitable arrangements for storing the tile elimination data for the second (rendering) processing pass can also be used, as desired.

The actual rendering for the tiles, e.g., that survive the (early) tile elimination, can be performed in any suitable and desired manner, e.g. in the normal way for a tile-based renderer. Particularly, for any tiles that should be rendered (e.g. based on the tile elimination data), the graphics processor may read the primitive lists in order to determine which primitives need to be rendered for which tile, and then render the primitives listed for each of the tiles appropriately, e.g. one after another.

In an embodiment the graphics processor is configured to perform the rendering in a pipelined fashion (the rendering circuit is thus in an embodiment configured to implement a rendering pipeline)

The rendering pipeline may contain any suitable and desired processing stages that a graphics processing pipeline may contain. In an embodiment, it includes, in an embodiment in this order, one or more of, and in an embodiment all of: a primitive list reading circuit; a rasteriser; an early depth (or an early depth and stencil) tester; a renderer, in an embodiment in the form of a fragment shader; a varyings position evaluation (interpolator) associated with the fragment shader; a late depth (or depth and stencil) tester; a blender; one or more tile buffers; and a tile write back unit.

As mentioned above, the graphics processor (rendering circuit) in an embodiment further comprises a scheduling circuit, e.g. in the form of a command stream frontend, that is configured to control the issuing of tiles into the rendering pipeline. Other (e.g. non-command stream based) arrangements would of course also be possible for controlling the rendering of tiles.

In embodiments, the tile elimination is performed by the scheduling circuit (e.g. command stream frontend), as discussed, such that any 'empty' tiles are not issued to the rendering pipeline but various other embodiments for controlling the rendering of tiles are contemplated, as discussed above.

The tile elimination operation according to the technology described herein may in some cases be selectively enabled/disabled. That is, the graphics processor may be selectively operated in the manner described above.

For example, it may be desired in some cases to only operate the graphics processor in the manner of the technology described herein when it is ensured that at least some tiles can be eliminated. In other words, there may be some situations where it is necessary (or desirable) to render all of the tiles for a render output, even if they are in principle 'empty' of (user drawn) geometry (primitives).

In that case, any part of the operation according to the technology described herein may be selectively enabled/disabled, e.g. depending on the circumstances. For example, in some cases, the graphics processor may still be configured to generate tile elimination data during the first (tiling) processing pass, but the use of this data during the second (rendering) processing pass is disabled. Alternatively, in other cases, the generation of the tile elimination data during the first (tiling) processing pass may also be disabled. Various arrangements would be possible in that regard.

The technology described herein may generally find application in any suitable tile-based rendering graphics processing system in which a render output (e.g. frame) is sub-divided into a plurality of regions for rendering, with each region corresponds to a respective area of the render output. This sub-division of the render output into tiles can be performed in any suitable manner, as desired. In an embodiment, the rendering tiles are rectangles, e.g. squares, but other arrangements would be possible.

As mentioned above, the primitive lists of the technology described herein may have any suitable correspondence with the regions into which the render output is sub-divided. For example, a primitive list may be prepared for each region, on a one-to-one basis. However, it may also be the case that a primitive list is prepared for a plurality of regions, or that multiple primitive lists are prepared that cover a single region. Various arrangements are possible in this regard and the technology described herein can be applied to any suitable primitive lists.

The primitive lists once prepared are in an embodiment then written back to memory so that they can subsequently be fetched into a rendering pipeline of the graphics processor for rendering the scene (although other arrangements would of course be possible—for example, the primitive lists may be written out directly to local storage on the graphics processor for access by the rendering pipeline). As mentioned above, the tile elimination data is in an embodiment stored separately and in addition to the primitive lists. The tile elimination data may, e.g., thus be stored in a separate portion of the same memory system, or may be stored in a different memory system, etc., as desired. Various arrangements would be possible in this regard.

Once the primitive lists have been generated and written out, the primitive lists can then be used, e.g. in the normal way, to generate the desired render output. For instance, once the primitives and their vertices have been defined, and the vertex data obtained, this vertex data can then be processed by a graphics processing system, in order, e.g. to display the desired render output. This processing basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively. These processes can use the primitive lists generated according to the technology described herein.

The technology described herein can be used for all forms of output that a (tile-based) graphics processor (graphics processing pipeline) may be used to generate, such as frames for display, render-to-texture outputs, etc.

In some embodiments, the graphics processor comprises, and/or is in communication with, one or more memories and/or memory devices that store the data described herein, and/or store software for performing the processes described herein.

In embodiments, the graphics processor may thus be provided as part of an overall data e.g. graphics processing system comprising the graphics processor and a memory, e.g. to which the primitive lists and tile elimination data can be written during the first (tiling) processing pass (and then fetched from during the second (rendering) processing pass).

The graphics processor (and/or graphics processing system) may also be in communication with a host microprocessor, and/or with a display for displaying images based on the data generated by the graphics processing system.

In an embodiment, the various functions of the technology described herein are carried out on a single graphics processing platform that generates and outputs the rendered data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, and pipelines of the technology described herein may comprise a suitable processor or processors, controller or controllers, functional units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, if desired.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Various embodiments will now be described by way of example only and with reference to the figures.

The technology described herein relates to graphics processing systems that use so-called “tile-based” rendering. In tile-based rendering, the two-dimensional scene to be displayed is sub-divided or partitioned into a plurality of smaller sub-regions, usually referred to as “tiles”. The tiles (sub-regions) are each rendered separately (typically one-after-another). The rendered sub-regions (tiles) are then recombined to provide the complete frame for display.

In such arrangements, the scene is typically divided into regularly-sized and shaped sub-regions (tiles) (they are usually e.g., squares or rectangles) but this is not essential.

The advantage of such tile-based rendering is that primitives that do not appear in a given tile do not have to be processed for that tile, and therefore can be ignored when the tile is processed. This can allow the overall amount of graphics processing necessary for a given scene to be reduced.

In a tile-based rendering system, it is accordingly usually desirable to be able to identify and know those primitives that are actually present in a given sub-region (tile), so as to, e.g., avoid unnecessarily rendering primitives that are not actually present in a tile. In order to facilitate this, it is known to prepare for each sub-region (tile) a list of the primitives to be rendered for that sub-region (e.g. that will appear in the sub-region). Such a “primitive list” (which can also be referred to as a “tile-list”) identifies (e.g. by reference to a primitive indicator) the primitives to be rendered for the tile (sub-region) in question.

The process of preparing primitive lists for each sub-region (tile) to be rendered basically therefore involves determining the primitives that should be rendered for a given sub-region (tile). This process is usually carried out by determining (at a desired level of accuracy) the primitives that intersect (i.e. that will appear (at least in part) within) the tile in question, and then preparing a list of those primitives for future use by the graphics processing system. (It should be noted here that where a primitive falls into more than one tile (as will frequently be the case), it is included in the primitive list for each tile that it falls within.) In effect, each sub-region (tile) can be considered to have a bin (the primitive list) into which any primitive that is found to fall within (i.e. intersect) the sub-region is placed (and, indeed, the process of sorting the primitives on a tile-by-tile basis in this manner is commonly referred to as "binning").

The process of determining the primitives that should be listed (rendered) for any given tile described above (the "binning" process) can be carried out at varying levels of precision, for example depending on efficiency optimisations for different parts of the tiling and rendering processes. For example, at the most precise level, it could be determined exactly which tiles a given primitive will appear at least in part in, and the primitive then included in the primitive lists for those tiles only. This is commonly referred to as "exact" binning.

FIG. 1 illustrates an exact binning process. As shown in FIG. 1, the scene 1 to be displayed is divided into sixteen regularly sized sub-regions or tiles 2. It is then determined for each primitive in the scene, which tile or tiles the primitive actually appears (falls) within. The primitive is added to the primitive list for each tile that it is found to fall within. Thus, taking the example shown in FIG. 1, the primitive 3 is added to the primitive list for tile 4, the primitive 5 is included in the primitive list for tiles 6 and 7, the primitive 8 is included in the primitive lists for tiles 9, 10, 11 and 12, and the primitive 13 is included in the primitive list for tile 12. (It should be noted here that FIG. 1 shows only a few tiles and primitives for clarity purposes. As will be appreciated by those skilled in the art, in an actual graphics processing operation, there will typically be many more primitives and tiles.)

It is also known to prepare primitive lists with a lower precision than is achieved with exact binning. This can be useful to, e.g., simplify the preparation of the primitive lists. One common "less precise" binning technique is "bounding box" binning. In this case, a so-called "bounding box" is drawn around a primitive or a set of primitives, and then the tiles covered by the bounding box are determined. The primitive or primitives that the bounding box represents (i.e. that are encompassed by the bounding box) are then listed (binned) for each tile that the bounding box has been found to cover (at least in part).

Figure 3:
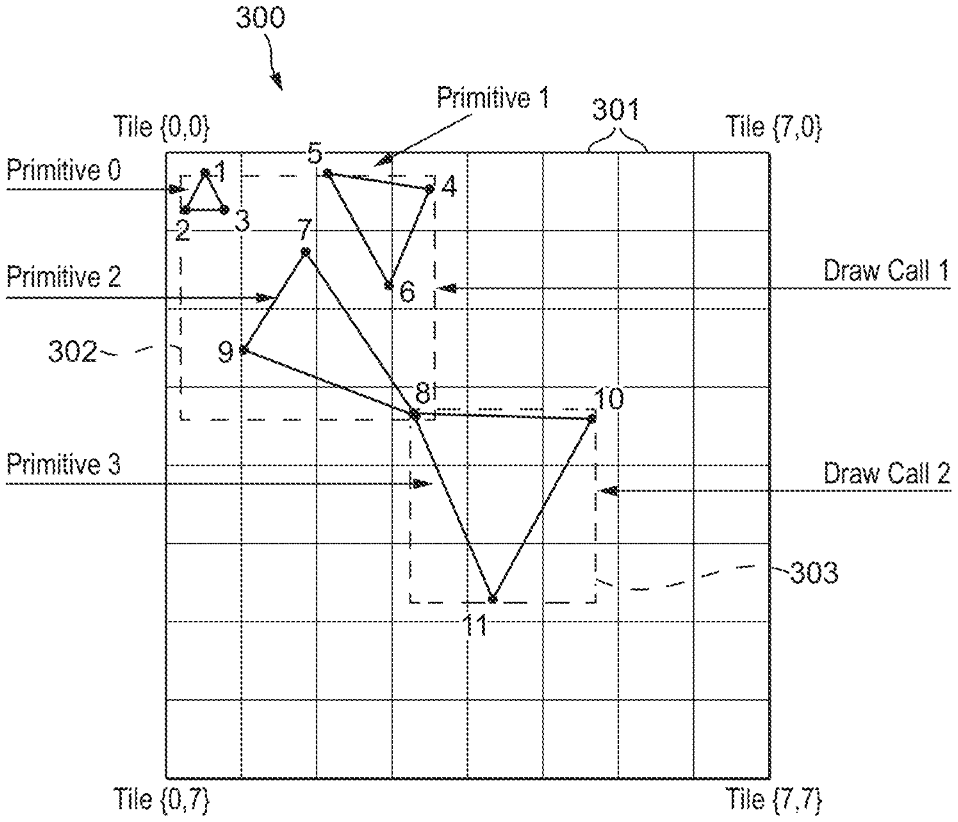
FIG. 3 shows an example scene of primitives to be displayed to illustrate further aspects of tile-based graphics processing.

An example of such arrangements using per primitive bounding boxes is shown in FIG. 3, which will be described further below. A bounding box arrangement thus uses a bounding box to determine the tiles for which a given primitive should be listed to be rendered, rather than the primitive itself. This can mean, e.g., that a primitive may be listed for rendering for a tile that it does not actually fall within (e.g. if the bounding box does not sufficiently tightly or precisely surround the primitive), but on the other hand, the use of bounding boxes in this manner can simplify the preparation of the primitive lists.

Once lists of primitives to be rendered (primitive lists) have been prepared for each sub-region (tile) in this way, the (primitive) lists are stored for use, e.g., to allow the system to identify which primitives need to be considered (and rendered) when the tile in question is rendered.

Such tile-based rendering arrangements have been found to work well, as they can, for example, help to avoid primitives still being processed for regions of the scene where they are not present.

Figure 2:
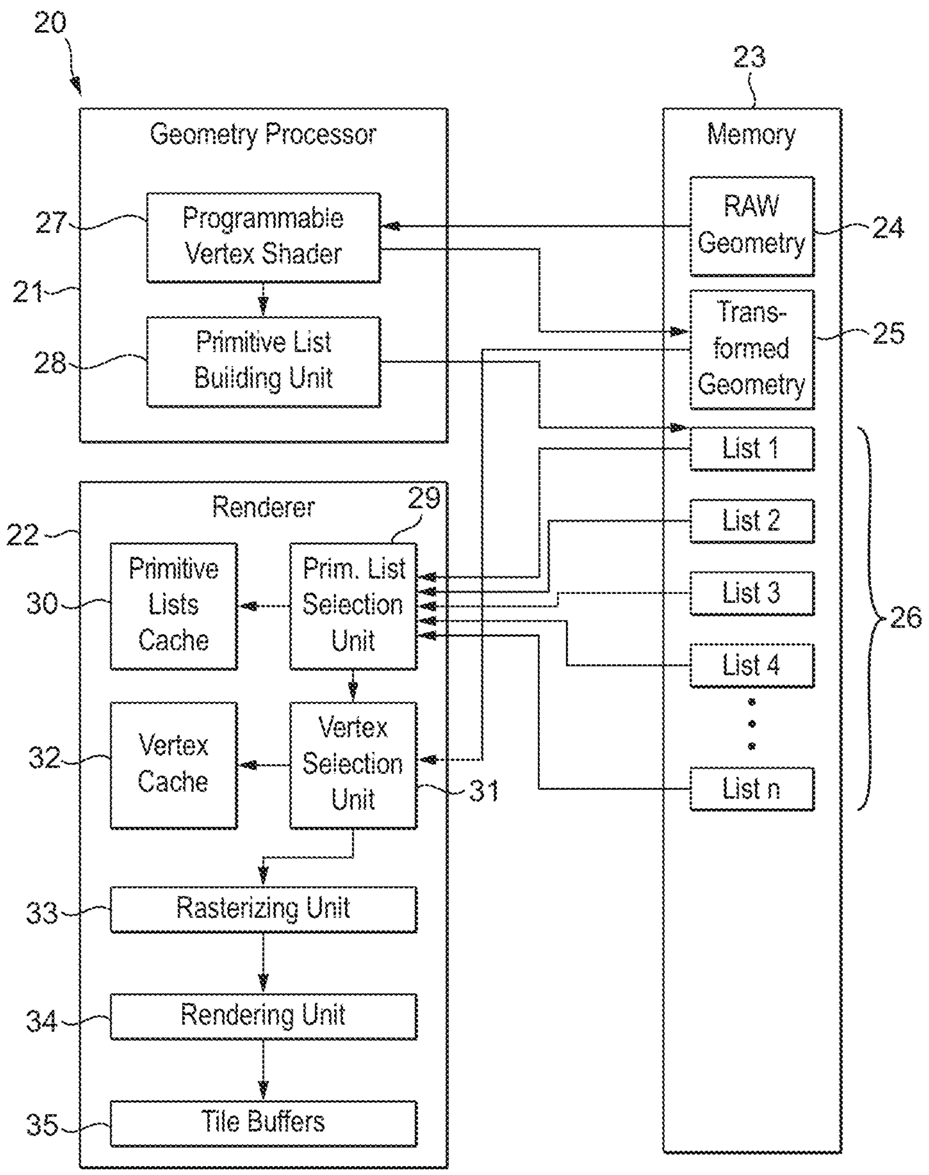
FIG. 2 shows schematically an arrangement of a more conventional tile-based graphics processing system.

FIG. 2 shows schematically a graphics processor 20 that may be operated in accordance with the technology described herein. The graphics processor 20 includes a geometry processor 21, and a renderer 22, both of which can access a memory 23. The memory 23 may be "on-chip" with the geometry processor 21 and renderer 22, or may be an external memory that can be accessed by the geometry processor 21 and renderer 22.

The memory 23 stores, inter alia, and as shown in FIG. 2, a set of raw geometry data 24 (which is, for example, provided by the graphics processor driver or an API running on a host system (microprocessor) of the graphics processor 20), a set of transformed geometry data 25 (which is the result of various transformation and processing operations carried out on the raw geometry 24), and a set of primitive lists 26. The primitive lists 26 are prepared in accordance with the technology described herein. This process will be described in more detail below.

The transformed geometry data 25 comprises, for example, transformed vertices (vertex data), etc.

The geometry processor 21 comprises, inter alia, a programmable vertex shader 27, and a primitive list building unit 28. The programmable vertex shader 27 takes as it input the raw geometry data 24 stored in the memory 23, and processes that data to provide transformed geometry data 25 (which it then stores in the memory 23) comprising the geometry data in a form that is ready for two-dimensional ('2D') placement in the frame to be displayed. The programmable vertex shader 27 and the processes it carries out can take any suitable form and be any suitable and desired such processes.

The primitive list building unit 28 carries out the tiling and primitive list preparation processes of the technology described herein of allocating the draw calls to the primitive lists which are then used by the renderer 22 to identify the draw calls that should be rendered for each sub-region of the scene to be rendered (and includes suitable circuitry for doing this). To do this, the primitive list building unit 28 takes as its input the transformed and processed vertex data from the programmable vertex shader 27 (i.e. the positions of the graphics object in the scene), builds primitive lists using that data, and stores those lists as the primitive lists 26 in the memory 23.

The renderer 22 includes a primitive list selection unit 29, a primitive list cache 30, a vertex selection unit 31, a vertex data cache 32, a rasterising unit 33, a rendering unit 34, and tile buffers 35.

The rasterising unit 33, rendering unit 34, tile buffers 35 operate, in this embodiment, in the same manner as such units normally operate in graphics processing systems. Thus the rasterising unit 33 takes as its input a primitive and its vertices, rasterises the primitive to fragments, and provides those fragments to the rendering unit 34. The rendering unit 34 then performs a number of rendering processes, such as texture mapping, blending, shading, etc. on the fragments, and generates rendered fragment data which it stores in the tile buffers 35 for providing to a frame buffer for display.

The primitive list selection unit 29 of the renderer 22 determines which draw call, and hence which primitive, is to be rendered next. It does this by considering the primitive lists 26 stored in the memory 23, and selecting from one of those lists the next graphics object (draw call) to be rendered.

The primitive list selection unit 29 can also place one or more primitive lists in the primitive list cache 30.

The primitive list selection unit 29 provides the primitive that it has selected for rendering next to the vertex selection unit 31. In response to this, the vertex selection unit 31 retrieves the appropriate transformed vertex data for the primitive in question from the transformed geometry data 25 stored in the memory 23, and then provides the primitive (i.e. its transformed vertex data) to the rasterising unit 33 for processing. The vertex selection unit 31 can cache vertex data that it has retrieved from the memory 23 in the vertex data cache 32, if desired.

FIG. 3 shows an exemplary scene to be displayed that will be used as the exemplary scene for display in the following description of the tile-based rendering process that is being performed by the graphics processing pipeline in FIG. 2.

As can be seen from FIG. 3, the scene 300 contains four primitives, which are grouped into two "draw calls", draw call 1 and draw call 2. Primitives 0, 1 and 2 are grouped as draw call 1, and primitive 3 belongs to draw call 2. (Grouping primitives in "draw calls" basically means that the application programmer wants all the primitives in the draw call to be drawn in one go, typically for performance reasons. Primitive groups in the same draw call typically share the same state and shader programs data.)

It should also be noted here that in view of the fact that there are two separate draw calls, with primitive 2 in one and primitive 3 in the other, the vertex 8 shown in FIG. 3 cannot be shared between primitive 2 and primitive 3, but instead is represented when the vertices are defined for the different draw calls as two different vertices, with the same vertex location and vertex attributes.

As shown in FIG. 3, the scene 300 to be rendered is divided into plural individual sub-regions or tiles 301.

As will be appreciated by those skilled in the art, in practice any given scene to be rendered will typically comprise many more primitives and draw calls than the four primitives and two draw calls shown in FIG. 3. However, FIG. 3 shows four primitives and two draw calls only for simplicity and clarity purposes.

In the present example, the primitive list building unit 28 determines the location of each draw call, Draw Call 1 and Draw call 2, and lists the draw calls in a primitive list for each tile which the draw call falls within. In this way, the system can identify which draw calls should be rendered for each sub-region.

This could be done using, e.g., an exact binning technique, as shown in FIG. 1, in which case the primitive list building unit 28 uses the determined transformed vertex positions it is provided with for a given draw call by the programmable vertex shader 27 to identify which sub-regions and sets of sub-regions the draw call falls within (intersects).

FIG. 3 however illustrates an example of a bounding box technique, e.g. of the type described early, in which rather than using the actual vertex positions to perform the binning operation, the binning is instead performed using a less precise bounding box representation of the primitives. In particular, FIG. 3 shows exemplary bounding boxes 302, 303 for the draw calls, Draw call 1 and Draw Call 2. In this case, the bounding box may be generated as part of the primitive list building process, e.g., by the primitive list building unit, but other arrangements would, of course, be possible.

This process is repeated by the primitive list building unit 28 for each and every draw call in the scene to be rendered in turn, until complete primitive lists 26 (lists of draw calls) have been generated for each tile that the scene to be rendered is divided into.

The primitive list building unit 28 in the present example places the draw calls in the primitive lists 26 in the order that it receives the draw calls from the programmable vertex shader 27. This means that, so far as each individual primitive list 26 is concerned, the draw calls are listed according to the desired order of rendering the draw calls for that tile.

As discussed above, the renderer 22 also includes a primitive list cache 30 and a vertex data cache 32. These caches may comprise local memory provided on the renderer 22 that can be more rapidly accessed by processing units of the renderer (and in particular the primitive list selection unit 29 and vertex selection unit 31, respectively) than the main memory 23.

The primitive list selection unit 29 is configured to store in the primitive list cache 30 one or more primitive lists 26 that it has read from the main memory 23.

The vertex selection unit 31 can similarly cache vertex data that it retrieves from the transformed geometry data 25 in the memory 23 in the vertex data cache 32, again in particular where it can be identified that the vertex data will be required for a primitive again.

Figure 4:
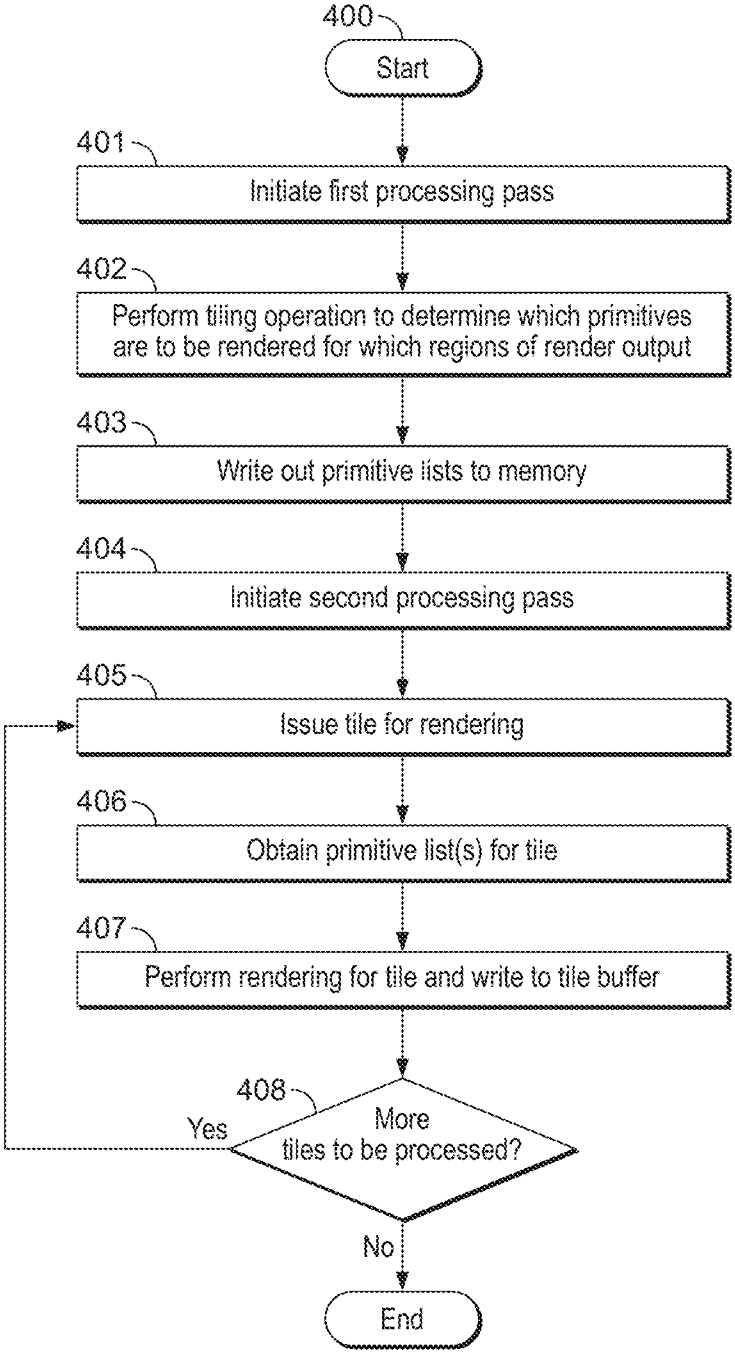
FIG. 4 is a flowchart illustrating a more conventional tile-based graphics processing scheme.

FIG. 4 is a corresponding flow chart illustrating a more conventional tile-based rendering process.

The process starts with a render output (e.g. frame) that is to be generated (step 400). The overall generation of the render output is then performed in two, separate processing passes, e.g. as explained above.

Thus, the first processing pass is initiated (step 401), and a tiling operation is performed to determine which primitives in a sequence of primitives defined for the render output are to be rendered for which of the regions into which the render output is divided for sorting purposes (step 402). This sorting operation may be performed as described above, e.g. in relation to either FIG. 1 or FIG. 3, by the primitive list building unit 28. The result of this is to generate a corresponding set of primitive lists 26, which are then written out to memory accordingly (step 403).

Once all of the primitive lists 26 have been prepared, the second processing pass is then initiated (step 404). The tiles into which the render output is sub-divided for rendering are then issued, e.g. one after another, into the rendering pipeline (step 405). For each tile to be rendered, the primitive list selection unit 29 then obtains the relevant primitive list or lists 26 for the tile in question, and then performs the rendering of the tile, e.g. as described above (step 406).

The result of the tile rendering can then be written into the tile buffers 35 (step 407). If there are more tiles to be rendered (step 408—yes), the next tile is then rendered in the same way, and so on, until all of the tiles have been rendered (step 408—no). The rendering is then complete and the tile buffers 35 can be written out, e.g. to a frame buffer for display.

Figure 5:
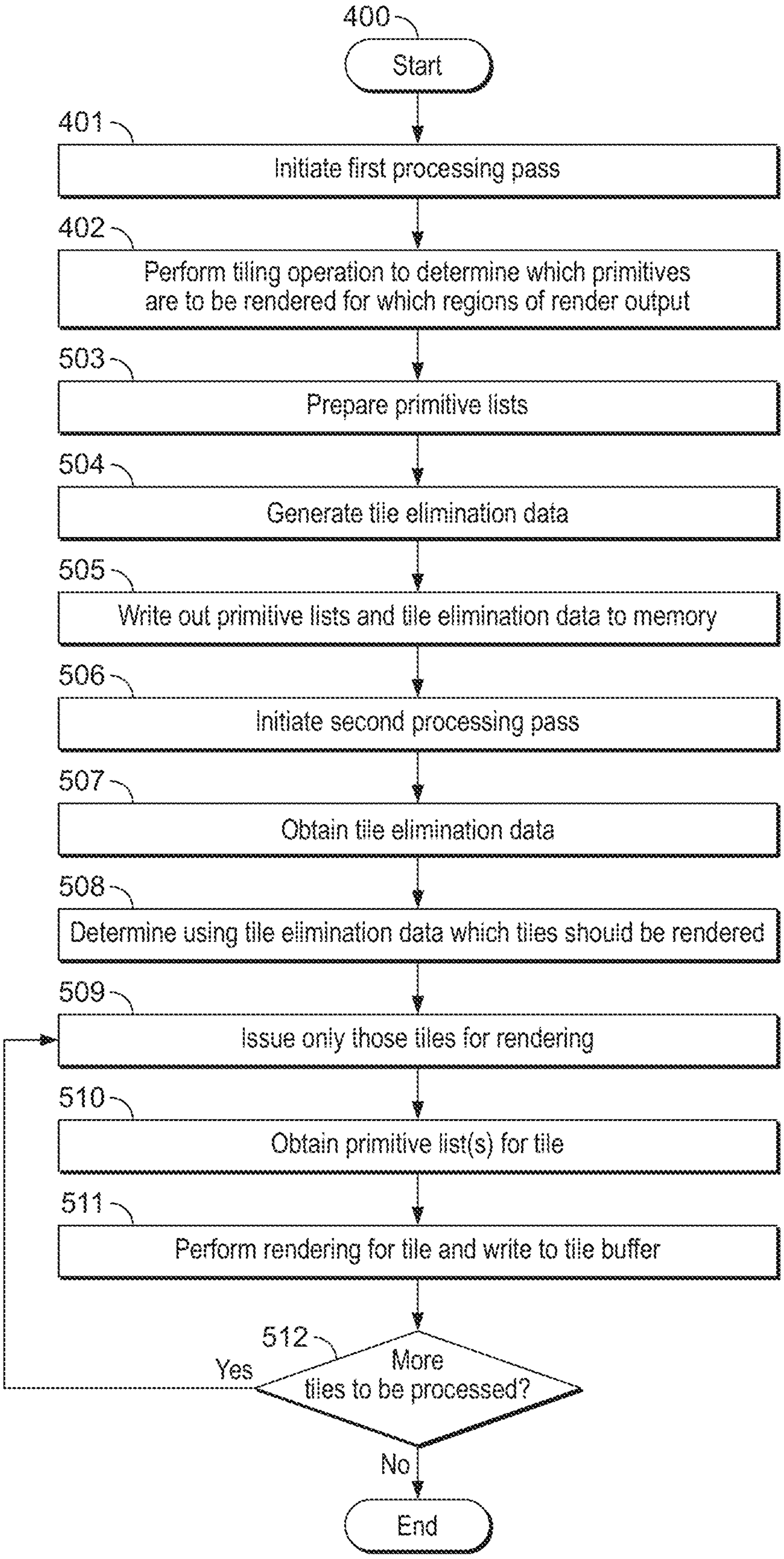
FIG. 5 is a flowchart illustrating an improved tile-based graphics processing scheme according to an embodiment.

FIG. 5 is a corresponding flowchart illustrating an improved tile-based rendering scheme according to an embodiment.

The processing in FIG. 5 generally follows the processing described above in relation to FIG. 4. Thus, the initial processing steps in the first processing pass to determine which primitives are to be rendered for which regions of the render output (steps 400, 401, 402) are performed in the same manner for the more conventional tile-based rendering scheme shown in FIG. 4.

In FIG. 5, however, after the primitive lists have been prepared (step 503), there is a further step of generating additional "tile elimination data" (step 504), the purpose of which will be explained further below.

The result of the first processing pass in FIG. 5 is thus to generate, in addition to the primitive lists, a set of tile elimination data. The primitive lists and tile elimination data are then both written out to memory (step 505). In the present embodiment, the tile elimination data is stored separately and in addition to the primitive lists.

When the second processing pass is initiated (step 506), the graphics processor can then, at the start of the second processing pass, obtain the tile elimination data that was generated during the first processing pass (step 507). The obtained tile elimination data is then used to control the rendering of the tiles.

For example, as shown in FIG. 5, the graphics processor is able to determine using the tile elimination data which tiles should be rendered (step 508), and then issue those tiles (and only those tiles) for rendering (step 509). The rendering for the selected tiles is then performed as normal, e.g. as described above, by obtaining the primitive list(s) (step 510), rendering the primitives for the tile accordingly, and writing the result to the tile buffers 35 (step 511). This is then repeated for the next tile (step 512—yes) and so on until all of the tiles to be rendered have been rendered (step 512—no), at which point the rendering is finished, and the tile buffers 35 can be written out, e.g. to a frame buffer for display.

Thus, in FIG. 5, only a subset of the tiles are issued for rendering. On the other hand, other tiles are eliminated at the start of the second processing pass, such that they are not issued for rendering ('early tile elimination').

The purpose of the "tile elimination" data that is generated during the first processing pass (at step 504) is thus to identify 'empty' tiles that do not need to be rendered, such that these tiles can be eliminated earlier in the second processing pass, to improve performance. The "tile elimination" data thus essentially indicates which of the tiles need to be rendered, e.g. since they contain primitives to be rendered. These indications can then be used by the graphics processor when performing the second processing pass to selectively control the rendering of tiles, in particular to facilitate earlier elimination of tiles that do not need to be rendered.

The tile elimination data can be generated in various suitable ways. Two main embodiments will be described below but other examples would of course be possible.

Figure 6:
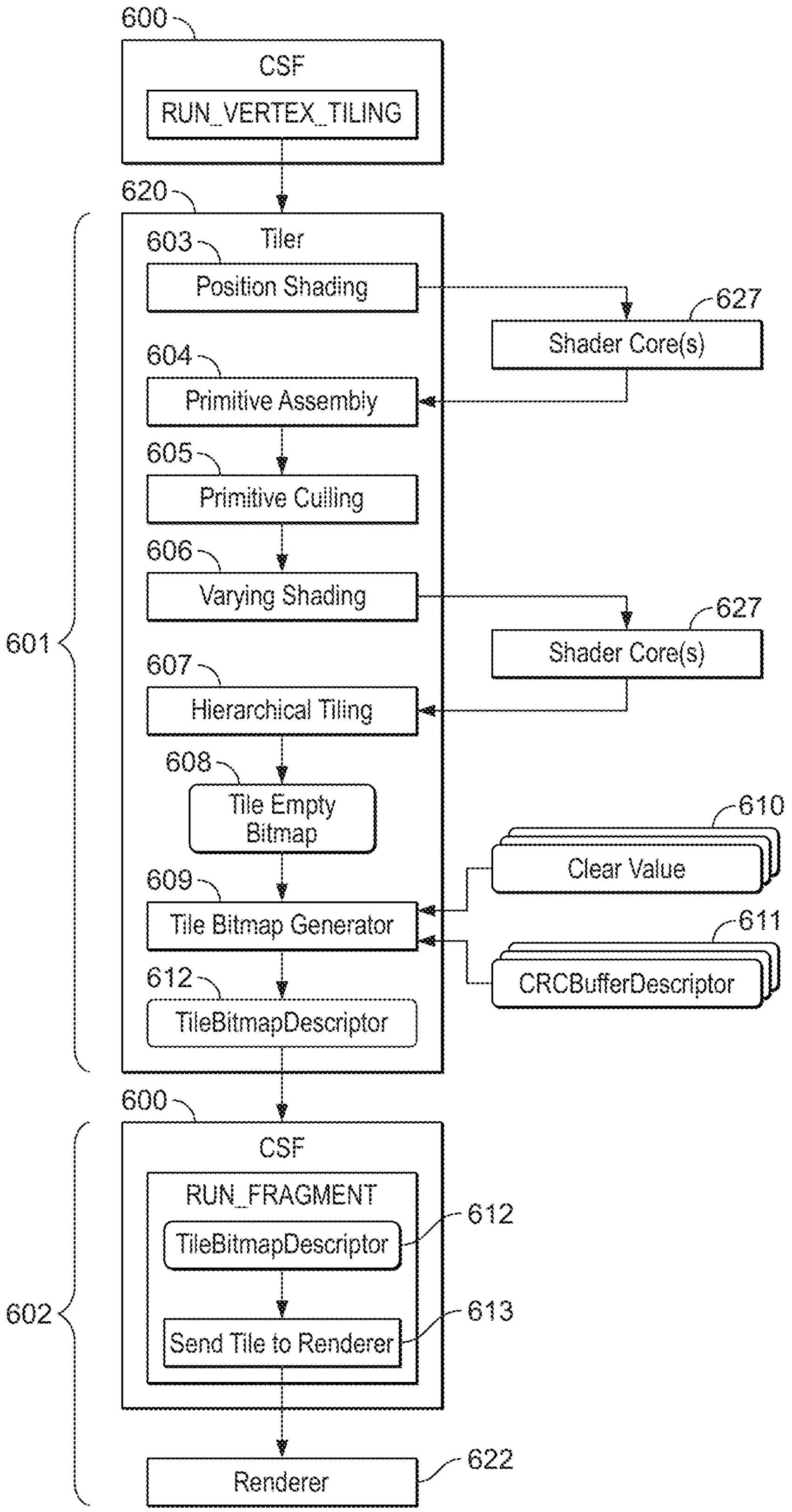
FIG. 6 shows schematically a graphics processing pipeline according to a first main embodiment.

FIG. 6 shows schematically a graphics processing pipeline according to a first main embodiment.

In the graphics processing pipeline illustrated in FIG. 6 the overall graphics processor operation is controlled by a command stream frontend 600 that schedules processing jobs for the graphics processor. The command stream frontend 600 is thus configured to initiate a first processing pass 601 in response to receiving a suitable command to do so at the start of a render pass (e.g. a 'RUN VERTEX TILING' command, as shown in FIG. 6).

The geometry processing circuit (tiler) 620 is then configured to perform the geometry processing in a pipelined manner using one or more programmable geometry processing shader cores 627. In FIG. 6, the tiler pipeline thus comprises, in order, a position (vertex) shading stage 603; a primitive assembly stage 604; a primitive culling stage 605; a varying shading stage 606; and a hierarchical tiling stage 607 that performs the tiling operation using the processed geometry to prepare the primitive lists.

It will be appreciated that this is just one example of a geometry processing circuit (tiler) pipeline 620 and that various other functional stages may be provided as desired. Likewise, not all of the stages shown in FIG. 6 need to be present.

After the hierarchical tiling stage 607, as part of the finalisation of the primitive lists (e.g. to facilitate their write out by adding suitable end pointer commands), the tiler builds a suitable data structure indicating which tiles are empty/non-empty which data structure in the present embodiment is provided in the form of an empty/non-empty tile bitmap 608 (although other suitable data structures could also be used as desired). This bitmap 608 thus stores, on a per tile basis, respective indications as to whether or not a given tile (corresponding to a bit position within the bitmap 608) contains any primitives. It will be appreciated that building this bitmap of empty/non-empty tiles 608 during the finalisation of the primitive lists has a negligible impact on performance and area.

The empty/non-empty tile bitmap 608 thus indicates which tiles do (or do not) contain primitives. Any tiles that contain primitive should always be rendered. However, there are other conditions that may need to be taken into account to determine whether or not a tile should be rendered.

For example, there are three scenarios that can occur for an 'empty' tile in a render output that does not contain any primitives to be rendered, in particular depending on whether or not the tile is to be cleared (to a single colour) during the render pass.

The first (and simplest) situation is that the tile is not cleared at the start of the render pass. In that case, the tile will already have the correct data for the render output (since it is not cleared at the start of the render pass). The tile can therefore be safely culled. The tile elimination data should therefore indicate accordingly that the tile does not need to be rendered.

However, the situation is more complicated if the tile is cleared to a colour at the start of the render pass. For example, in that case, the colour value that the tile will be cleared to (the 'clear_colour_value') might be different from the current colour(s) of the tile for the render output. Thus, it is necessary to determine whether or not this is the case, as the tile can only be eliminated if it is ensured that the tile already has the correct colour value (otherwise the tile will need to rendered to ensure it is cleared correctly, even though there is no geometry in the tile).

A similar situation occurs if the tile is to be cleared mid-render pass. For example, in order to clear a tile mid-render pass, a command may be inserted to draw a full screen primitive that covers all of the tiles. In that case, again, the last colour specified to be used for clearing the tile may be different from the current colour of the tile for the render output. Full screen primitives could in principle be treated as normal (user drawn) primitives when generating the empty/non-empty tile bitmap 608 but this would mean that all of the tiles would have to be rendered whenever a full screen primitive was encountered. According to the present embodiment, such full screen primitives are disregarded for the purposes of generating the empty/non-empty tile bitmap 608 and are instead handled exceptionally in the same manner as the clear commands that may be inserted at the start of the render output.

That is, in order to determine whether the tile can be safely eliminated when a full screen primitive is encountered, it is determined whether or not the tile already has the correct clear colour value, and if this is not the case, the tile must be rendered (even if it does not contain any primitives).

The check to determine whether or not the tile already has the correct clear colour value can be performed using suitable tile signatures ('CRC clear values') generated using the clear colour value 610. Thus, only when the signatures match can the tile safely be eliminated. In the present embodiment this is performed by executing, in the tile bitmap generator stage 609, a suitable compute shader program to create a further bitmap indicating whether or not the tile should be rendered, either because it contains geometry, or because it needs to be rendered regardless to ensure the correct colour value.

The inputs to this example shader are thus, for each tile;

A respective bit from the empty/non-empty tile bitmap indicating whether or not the tile contains any user-drawn primitives;

The last colour value used to the clear the tile;

Any other data needed to compute the CRC clear value; and

The current CRC clear value.

The possible outputs for a tile are then as follows;

If the bit from the empty/non-empty tile bitmap indicates that the tile does contain user-drawn primitives (which in this example is indicated by setting the respective bit in the empty/non-empty tile bitmap=0), the output bit is set to '1' to indicate that the tile should be rendered;

If the bit from the empty/non-empty tile bitmap indicates that the tile does not contain user-drawn primitives (bit=1), but the CRC clear values do not match, this means it cannot be ensured that the tile has the correct colour value, and the output bit is set to '1' to indicate that the tile should be rendered; or If the bit from the empty/non-empty tile bitmap indicates that the tile does not contain user-drawn primitives (bit=1), and the CRC clear values match, the output value is set to '0' to indicate that the tile does not need to be rendered (and can therefore be eliminated).

Thus, if the tile contains any user drawn primitives, the tile should always be rendered. Similarly, even if the tile does not contain user drawn primitives, but there is a CRC clear value mismatch, the tile should also be rendered to ensure the correct clear value. On the other hand, when the tile contains no user drawn primitives and the CRC clear values match, the tile may be safely eliminated.

Figure 7:
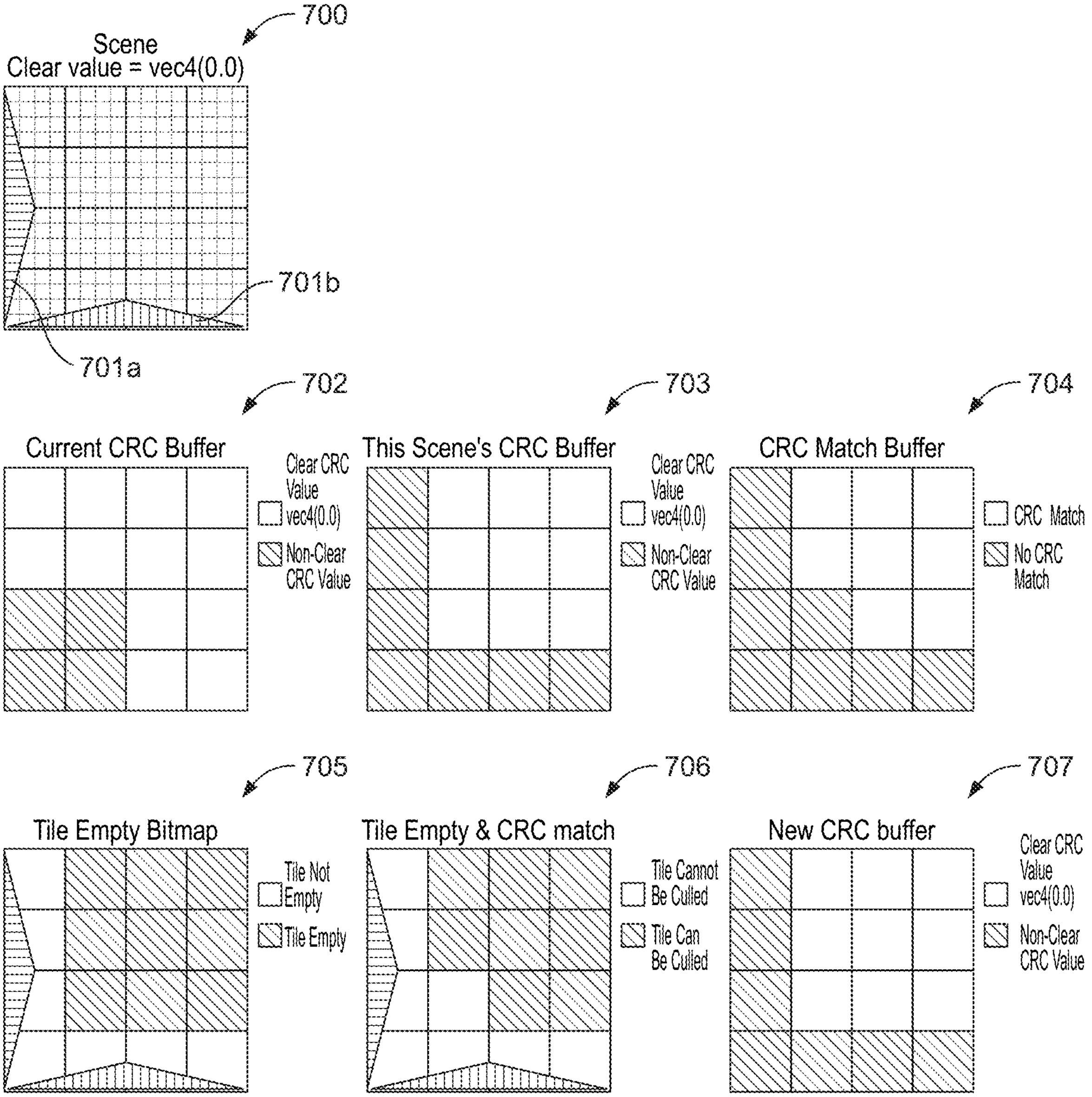
FIG. 7 illustrates further details of the first main embodiment.

FIG. 7 illustrates further details of the generation of the tile elimination data according to the first main embodiment.

In particular, FIG. 7 shows an example of a scene 700 containing two primitives 701A, 701B, that are respectively located towards the left and bottom edges of the frame. FIG. 7 also shows the current CRC clear buffer 702 for the render pass. The white tiles indicate tiles that were cleared during the previous frame. Thus, the CRC values for the white tiles indicate that the tile was cleared during the previous frame. The shaded tiles on the other hand indicate tiles that were not cleared during the previous frame and which may therefore need to be rendered since it is not guaranteed that the tile will have the correct clear value. The CRC values for the shaded tiles accordingly will not match the CRC values based on the clear colour value.

For the current scene, a different set of tiles may need to be cleared. Panel 703 thus shows the corresponding CRC clear buffer for the current scene, with the white tiles indicating which tiles should be cleared. A comparison is then made between the current and previous values to determine whether or not the tile(s) may potentially be eliminated. This is shown in panel 704 which illustrates the CRC match buffer 704 for this example indicating the subset of tiles that were cleared during the previous frame and are also to be cleared during the current frame. Thus, if the tile is also cleared during the current frame, it can be ensured that the tile has the correct clear colour value and so, as long as the tile does not contain any primitives, the tile may be safely eliminated.

Panel 705 shows the empty/non-empty bitmap for the scene in FIG. 7. Thus, as shown in FIG. 7, the top right nine tiles are empty, as the primitives 701A, 701B do not intersect these tiles. The bit values for these can be set accordingly to indicate that these tiles are empty of user drawn primitives. For instance, in this example, the bit value in respect of a tile is set to '0' if the tile contains (a part of) a primitive, or set to '1' if the tile is empty.

Panel 706 then shows the result of the shader program given above to determine which empty tiles can actually be eliminated (i.e. do not need to be rendered even though they are empty). The result of this in this example, as shown, is that one of the empty tiles should additionally be rendered, even though it does not contain any part of a primitive, as the CRC clear values do not match. The CRC buffer is also updated at this point, as shown in panel 707, to reflect the updated CRC clear values for the current scene. The CRC clear values from the current processing pass are then used as the current CRC clear buffer 702 for the next processing pass, and so on.

In the example above, when a clear command is present, a tile can thus be eliminated only when the tile does not contain any geometry and when it is ensured that the tile has the correct clear colour value. Thus, in the example shader above the inputs include the last colour value used to clear the tile and any other information required to compute the CRC clear value for the present render pass together with the current CRC clear value determined for the preceding render output. However, it will be appreciated that there may be other conditions that need to be checked in a similar way, e.g. to ensure that the tile can be safely eliminated from rendering. For example, even if the tile has the correct colour value, the tile may still need to be rendered to ensure that other outputs, e.g. the depth and/or stencil buffers, are correct. This can be done in a similar way as described above using respective CRC values for each output that may need to be checked, and then inputting suitable pairs of output (e.g. depth) values and corresponding CRC values calculated from the previous output (e.g. depth) value to the shader for determining whether or not the CRC values match.

Various other arrangements would of course be possible and the tile elimination data may in general take into account any suitable and desired information that may be taken into account to determine whether or not a tile should be rendered (or, equivalently, whether or not the tile can be safely eliminated).

The tile bitmap generator stage 609 thus generates a corresponding bitmap indicating for each tile whether or not the tile should be rendered (or equivalently whether or not the tile can be eliminated), based on these determinations. A suitable descriptor of the tile bitmap is then output. For instance, the tile bitmap descriptor 612 can then be written out to memory together with the primitive lists at the end of the first processing pass 601. However, it is important to note here that the tile bitmap descriptor and primitive lists are stored separately in memory so that they can be obtained independently during the second processing pass 602.

The second processing pass 602 is then initiated, e.g. by issuing an appropriate command to the command stream frontend 600 (e.g. a 'RUN FRAGMENT' command as shown in FIG. 6).

In FIG. 6, at the start of the second processing pass 602, in response to such command, the command stream frontend 600 is configured to obtain the descriptor for the tile bitmap 612 generated during the first processing pass 601 and a scheduling circuit 613 within the command stream frontend 600 then uses the tile bitmap 612 to control which tiles are sent to the renderer 622. The command stream frontend 600 is thus configured to control the scheduling of issuing tiles to the renderer 622 such that only those tiles that are indicated to be rendered based on the tile bitmap 612 generated during the first processing pass 601 are issued for rendering (whereas any tiles that the tile bitmap 612 indicates can be eliminated are effectively culled at this point, and not issued for rendering).

This therefore has the effect of reducing unnecessary processing for any empty tiles that do not need to be rendered, therefore improving rendering efficiency, e.g. by ensuring that the rendering pipeline (and fragment shader) only sees tiles that actually need to be rendered, with other tiles that can be culled being eliminated before they are issued into the rendering pipeline.

FIG. 6 and FIG. 7 illustrate a first main embodiment for generating a tile bitmap 612 that can be used for the purposes of tile elimination as described above. Other arrangements for generating such tile elimination data would however be possible.

Figure 8:
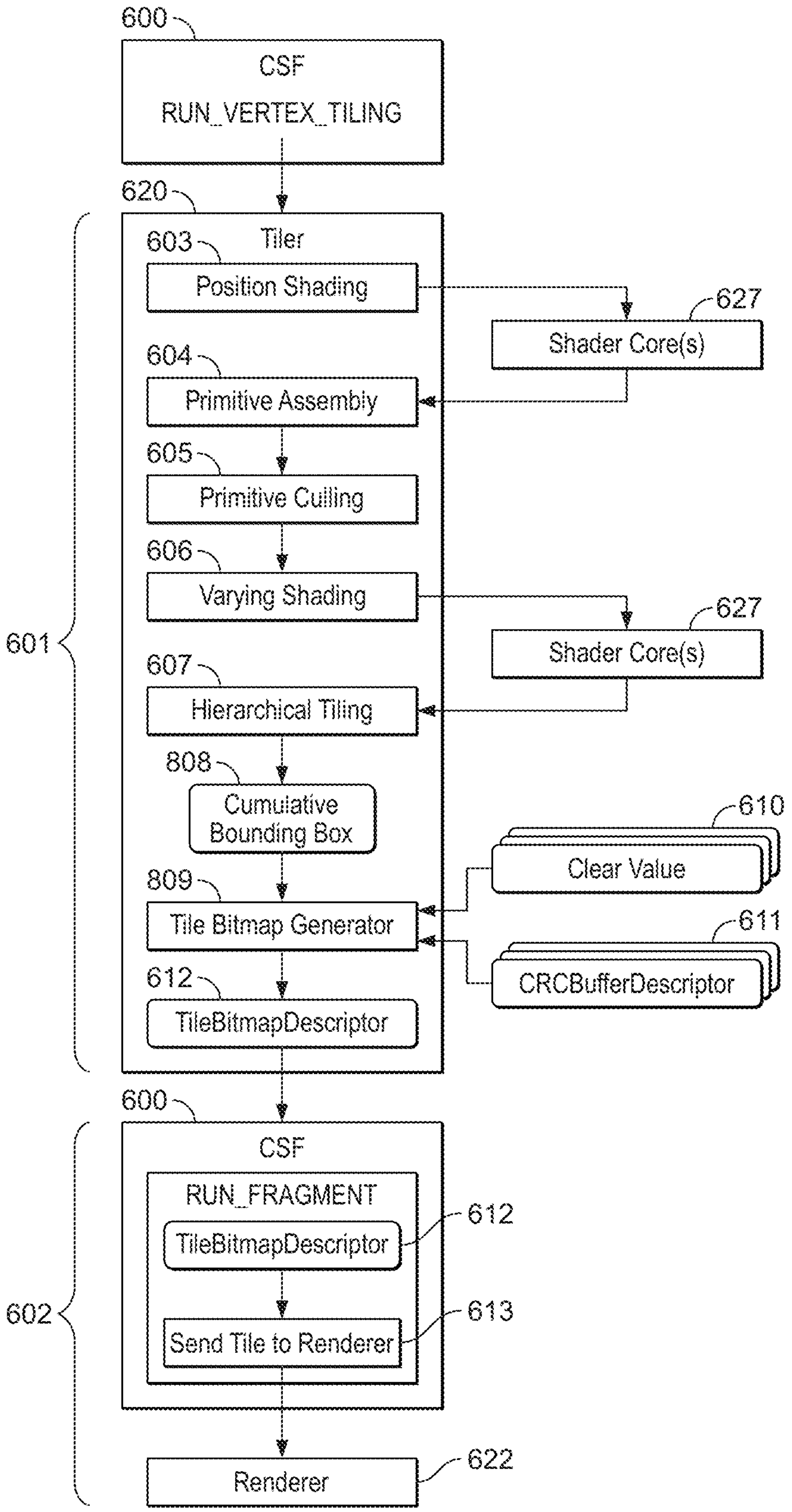
FIG. 8 shows schematically a graphics processing pipeline according to a second main embodiment.

For example, FIG. 8 shows schematically a graphics processing pipeline according to a second main embodiment.

The tiler pipeline in FIG. 8 is generally similar to that shown in FIG. 6, described above. For instance, in the same manner as described above, after the position (vertex) shading 603 has taken place, the tiler 620 is then configured to perform primitive assembly 604, cull and clip primitives (where possible) 605, initiate varying shading on the surviving primitives 606, and then perform the sorting process to build the hierarchical tile structure (i.e. to prepare the primitive lists) 607.

The process of building the primitive lists is a serial task, which means that the tiler 620 can readily keep track of certain information regarding all the primitives that have been processed and placed into the primitive lists so far when performing the hierarchical tiling stage 607.

Thus, in FIG. 8, the tiler 620 is configured to keep track of the smallest bounding box that encompasses all of the primitives that have been placed into the primitive list so far (a "cumulative" bounding box). This can be very efficient since the tiler may already be configured to handle per primitive bounding box operations, e.g. for sorting the primitives, as described above in relation to FIG. 3. Extending the tiler operations to maintain a separate, "cumulative" (per frame) bounding box can therefore be achieved with relatively little additional processing complexity.

Figure 9:
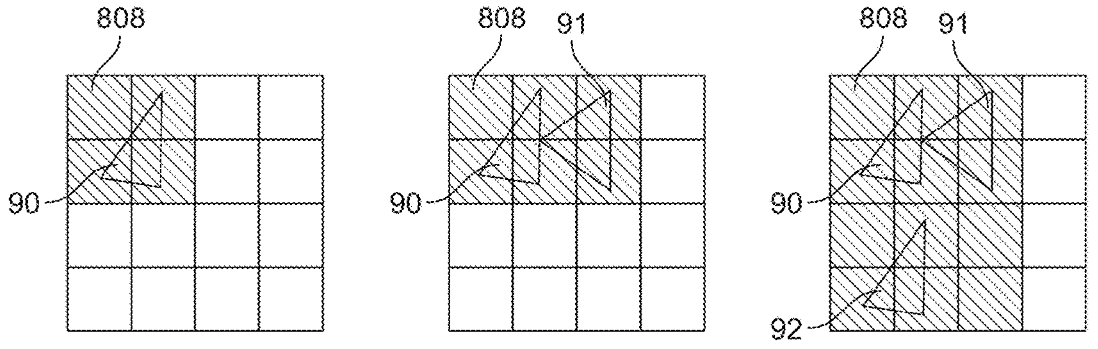
FIG. 9 illustrates an example according to the second main embodiment.

FIG. 9 illustrates further details of the second main embodiment in particular illustrating the incremental generation of a cumulative bounding box for a sequence of primitives.

In particular, FIG. 9 illustrates a scene 900 for which a sequence of three primitives 90, 91, 92 are to be processed. When processing the first primitive 90, a bounding box 808 is thus drawn to encompass the primitive 90. In this example, as shown in FIG. 9, the bounding box is aligned to the rendering tiles. However, it will be appreciated that more precise bounding box techniques could also be used, if desired. When the next primitive 91 is processed, the cumulative bounding box 808 is then expanded appropriately in order to encompass both of the primitives 90, 91 that have been processed so far. This is then repeated again for the next primitive 92, and so on, until the cumulative bounding box 808 eventually once all of the primitives in the sequence have been processed encompasses everything on screen.

Once all of the primitives have been processed, and sorted into corresponding primitive lists, the cumulative bounding box 808 generated in this way can be used to generate a tile bitmap 809 indicating, in a similar manner as described above in relation to FIG. 6 and FIG. 7, which tiles need to be rendered (or equivalently which tiles can be eliminated). In this case however rather than determining which tiles contain geometry that needs to be rendered using the primitive lists, this determination is made using the cumulative bounding box 808.

For example, each tile can be checked against the cumulative bounding box 808. If the cumulative bounding box 808 does not intersect the tile, this means that the tile is empty of geometry. On the other hand, any tiles that are intersected by the cumulative bounding box 808 may potentially contain geometry and so should always be rendered (as it cannot be guaranteed that there is no geometry within the tile that needs to be rendered).

This intersection testing can be performed by executing a suitable compute shader, e.g. at the end of the first processing pass, for each tile, as follows:

Inputs;

Bounding box bottom-left co-ordinate (x,y);

Bounding box top-right co-ordinate (x,y);

Tile's bottom-left co-ordinate (x,y); and

Tile's top-right co-ordinate (x,y).

Outputs:

If the tile intersects the bounding box, the output bit is set to '1' to indicate that the tile potentially contains geometry and should therefore be rendered; or If the tile does not intersect the bounding box, the output bit is set to '0' to indicate that the tile does not contain any geometry.

This shader will accordingly generates a suitable empty/non-empty bitmap indicating which tiles potentially contain geometry to be rendered (and which tiles do not contain any geometry). The shader takes as input a set of co-ordinates defining the cumulative bounding box 808 and a corresponding set of co-ordinates defining the tile that is to be tested.

Any tiles that intersect the bounding box may potentially contain geometry and should thus always rendered. A corresponding bit in the bitmap can therefore be set to '1' accordingly to indicate this. On the other hand, if the cumulative bounding box 808 does not intersect a given tile, this means that the tile could potentially be eliminated.

The task is then to actually determine if the tile can be culled, or whether the tile needs to be rendered anyway. This can be done as described above, e.g. by checking using the CRC values to check whether the tile has the correct clear colour value already (in which case it can safely be eliminated), or whether the tile needs to be rendered to update the clear colour value.

This can be done by executing a second compute shader to determine, for each tile, whether or not the tile should be rendered, or whether the tile can be safely eliminated, e.g. as follows:

Inputs;

Bounding box bottom-left co-ordinate (x,y);
Bounding box top-right co-ordinate (x,y);
Tile's bottom-left co-ordinate (x,y);
Tile's top-right co-ordinate (x,y);
Last colour used to clear tile;
Other data needed to compute CRC; and
Current CRC value.

Outputs:

If the tile intersects the bounding box, the output bit is set to '1' to indicate that the tile potentially contains geometry and should therefore be rendered; If the tile does not intersect the bounding box, but the CRC values do not match, this means it cannot be ensured that the tile has the correct colour value, and the output bit is set to '1' to indicate that the tile should be rendered; or If the tile does not intersect the bounding box, and the CRC values match, the output value is set to '0' to indicate that the tile does not need to be rendered.

Although described as two separate shaders it will be appreciated that the second shader in this example performs both checks. This would not however be necessary and the determinations could be made in various suitable ways. For example, a reduced version of the second shader could be used that only checks the CRC values for tiles that have been determined to not intersect the bounding box (e.g. as determined from the first shader program). Various arrangements would be possible in this regard. Also, as mentioned earlier, although the example shader given above only compares CRC values to determine whether the tile has the correct clear colour value, it will be appreciated that this approach can also be extended to compare CRC values for any other outputs (such as depth and/or stencil values) that may need to be checked before determining whether or not the tile can be safely eliminated.

The result of this is therefore to generate a tile bitmap indicating which tiles should or should not be rendered. The tile bitmap generated using the cumulative bounding box will have the same form as the tile bitmap described above in FIG. 6. Thus, a descriptor of the tile bitmap 612 can then be written out and then used in the same manner described above to control the rendering of tiles during the second processing pass 602.

Figure 10:
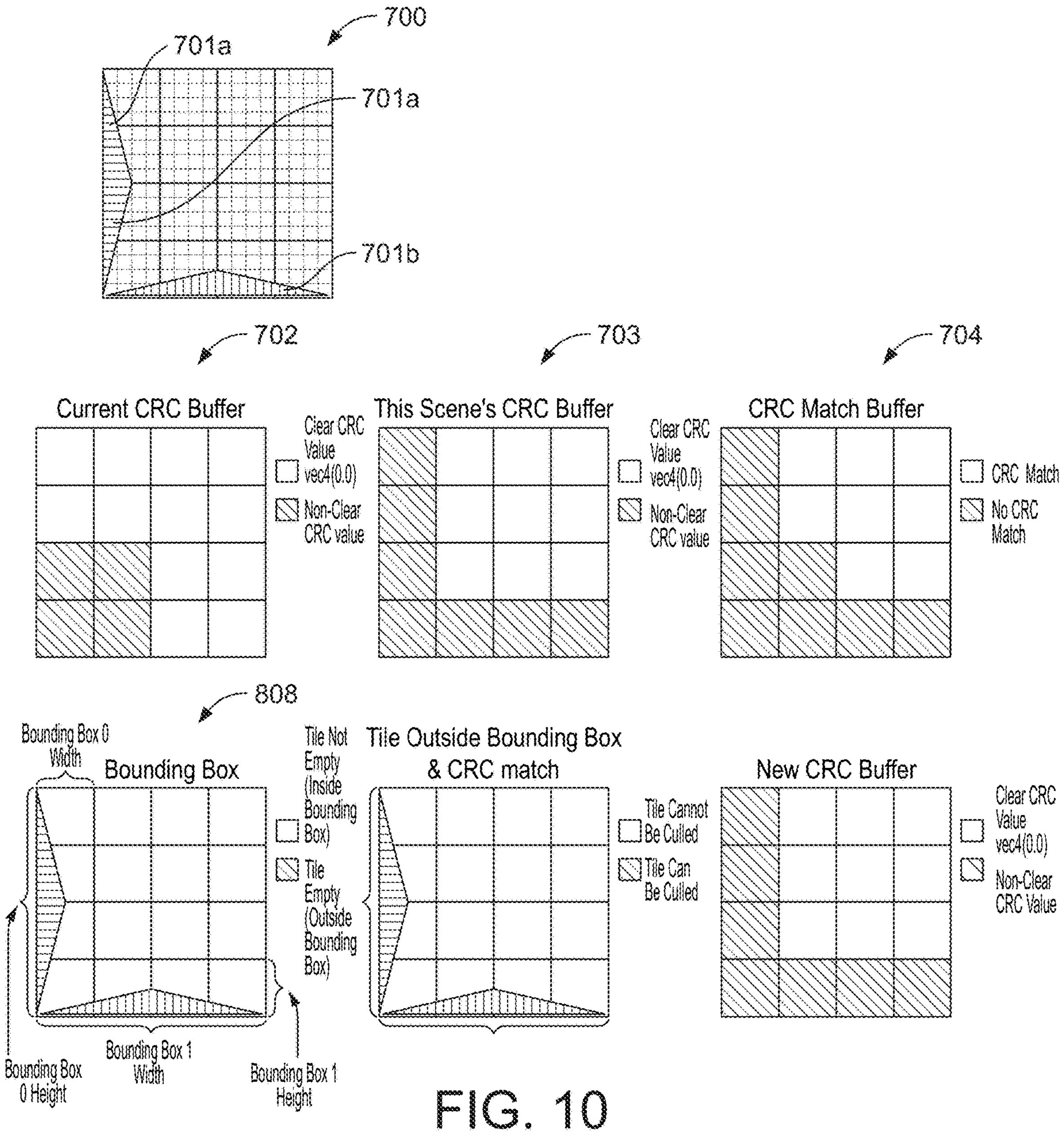
FIG. 10 illustrates another example according to the second main embodiment.

It will be appreciated that the cumulative bounding box approach is necessarily conservative. In general, therefore, the approach according to the first main embodiment can provide a finer-grained control of which tiles are rendered. For instance, FIG. 10 illustrates the result of the cumulative bounding box approach according to the second main embodiment for the scene 700 shown in FIG. 7.

In this case there are only two primitives 701A, 701B and a large number of empty tiles that can in principle be eliminated (as shown in FIG. 7). However, the primitives 701A, 701B in this example are distributed along the edges of the scene 700. This means that the cumulative bounding box encompassing these two primitives now encompasses the entire scene. This then causes the entire scene to be rendered, as it is not possible to tell from the cumulative bounding box that some of the tiles are in fact empty. The CRC buffer is updated as described above in relation to FIG. 7.

Nonetheless, the cumulative bounding box approach described in relation to FIG. 8 and FIG. 9 still works well in many cases, especially because primitive are often grouped together on screen.

Whilst two main embodiments are described above various other arrangements would of course be possible. For example, rather than using the cumulative bounding box to generate a bitmap indicating which tiles should be rendered, the cumulative bounding box could be directly output for use as the tile elimination data.

Thus, the foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of processing data in a graphics processor when performing tile-based rendering in which a render output is sub-divided into a plurality of tiles for rendering, the method comprising:

performing a first processing pass that generates, for a sequence of primitives to be processed for the render output, a cumulative bounding box encompassing all of the primitives in the sequence of primitives; and then performing a second processing pass to render the tiles into which the render output is sub-divided for rendering, the second processing pass including:

prior to issuing a tile for rendering, testing one or more regions of the render output for intersection with the cumulative bounding box to determine whether the tile intersects the cumulative bounding box and therefore potentially contains primitives to be rendered, so that issuing of tiles for rendering by the second processing pass is controlled based on the determination of which of the tiles potentially contain primitives to be rendered.

2. The method of claim 1, comprising writing the generated cumulative bounding box to memory.

3. The method of claim 1, wherein the testing the regions of the render output for intersection with the cumulative bounding box is performed in a hierarchical manner.

4. A method of processing data in a graphics processor when performing tile-based rendering in which a render output is sub-divided into a plurality of tiles for rendering, the method comprising:

performing a first processing pass that generates, for a sequence of primitives to be processed for the render output, a cumulative bounding box encompassing all of the primitives in the sequence of primitives; and then testing regions of the render output for intersection with the cumulative bounding box to determine which of the tiles into which the render output is sub-divided for rendering intersect the cumulative bounding box and therefore which of the tiles potentially contain primitives to be rendered, wherein generating the cumulative bounding box is part of generating a set of tile elimination data that is indicative of which of the tiles into which the render output is subdivided for rendering should be rendered for the render output and that is usable during a second processing pass to control the rendering of the tiles for the render output.

5. The method of claim 4, wherein the set of tile elimination data is generated and stored in a hierarchical manner.

6. The method of claim 1, further comprising determining, at least for any tiles that are determined to not potentially contain any primitives to be rendered, whether or not the tile should be rendered regardless, and indicating accordingly that any tiles that should be rendered regardless of whether or not the tile potentially contains any primitives should be rendered.

7. The method of claim 6, wherein the determination of whether or not a tile should be rendered regardless of whether the tile contains primitives involves comparing a tile signature that indicates whether or not an output associated with the rendering of the tile has potentially changed since a previous rendering operation, wherein when an output associated with the rendering of the tile has potentially changed, the tile should be rendered.

8. A graphics processor configured to perform tile-based rendering in which a render output is sub-divided into a plurality of tiles for rendering, the graphics processor comprising:

a geometry processing circuit that is configured to perform a first processing pass that generates, for a sequence of primitives to be processed for a render output, a cumulative bounding box encompassing all of the primitives in the sequence of primitives, the graphics processor further configured to:

test regions of the render output for intersection with the cumulative bounding box to determine which of the tiles into which the render output is sub-divided for rendering intersect the cumulative bounding box and therefore which of the tiles potentially contain primitives to be rendered, and determine, at least for any tiles that are determined to not potentially contain any primitives to be rendered, whether or not the tile should be rendered regardless, and to indicate accordingly that any tiles that should be rendered regardless of whether or not the tile potentially contains any primitives should be rendered.

9. The graphics processor of claim 8, further comprising a rendering circuit that is configured to perform a second processing pass to render the tiles into which the render output is sub-divided for rendering, wherein issuing of tiles for rendering by the second processing pass is controlled based on the determination of which of the tiles potentially contain primitives to be rendered.

10. The graphics processor of claim 9, wherein the geometry processing circuit outputs the cumulative bounding box generated by the first processing pass and wherein the testing the regions of the render output for intersection with the cumulative bounding box is performed by the rendering circuit during the second processing pass prior to issuing any tiles for rendering.

11. The graphics processor of claim 8, wherein the geometry processing circuit writes the generated cumulative bounding box to memory.

12. The graphics processor of claim 8, wherein the testing the regions of the render output for intersection with the cumulative bounding box is performed in a hierarchical manner.

13. The graphics processor of claim 8, wherein generating the cumulative bounding box is part of generating a set of tile elimination data that is indicative of which of the tiles into which the render output is subdivided for rendering should be rendered for the render output and that is usable during a second processing pass to control the rendering of the tiles for the render output.

14. The graphics processor of claim 13, wherein the set of tile elimination data is generated and stored in a hierarchical manner.

15. The graphics processor of claim 8, wherein the determination of whether or not a tile should be rendered regardless of whether the tile contains primitives involves comparing a tile signature that indicates whether or not an output associated with the rendering of the tile has potentially changed since a previous rendering operation, wherein when an output associated with the rendering of the tile has potentially changed, the tile should be rendered.

16. The method of claim 4, further comprising determining, at least for any tiles that are determined to not potentially contain any primitives to be rendered, whether or not the tile should be rendered regardless, and indicating accordingly that any tiles that should be rendered regardless of whether or not the tile potentially contains any primitives should be rendered.

17. A non-transitory computer storage medium storing instructions that when executed on at least one processor will cause the processor to perform a method as claimed in claim 1.

* * * * *